(12) United States Patent
Cannan et al.

(10) Patent No.: US 9,434,875 B1
(45) Date of Patent: Sep. 6, 2016

(54) ELECTRICALLY-CONDUCTIVE PROPPANT AND METHODS FOR MAKING AND USING SAME

(71) Applicant: CARBO Ceramics Inc., Houston, TX (US)

(72) Inventors: Chad Cannan, Cypress, TX (US); Todd Roper, Katy, TX (US); Steve Savoy, Austin, TX (US); Daniel R. Mitchell, Austin, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 14/572,486

(22) Filed: Dec. 16, 2014

(51) Int. Cl.
| | |
|---|---|
| *B32B 5/16* | (2006.01) |
| *B05D 7/00* | (2006.01) |
| *C09K 8/80* | (2006.01) |
| *B05D 5/12* | (2006.01) |
| *E21B 43/267* | (2006.01) |

(52) U.S. Cl.
CPC ............... *C09K 8/805* (2013.01); *B05D 5/12* (2013.01); *E21B 43/267* (2013.01); *C01P 2006/10* (2013.01); *C01P 2006/40* (2013.01); *Y10T 428/2438* (2015.01); *Y10T 428/2991* (2015.01)

(58) Field of Classification Search
CPC ............... Y10T 528/2438; Y10T 528/24388; Y10T 528/24413; Y10T 528/2443; Y10T 428/2438; Y10T 428/24388; Y10T 428/24413; Y10T 428/2443; C09K 8/62; C09K 8/805; E21B 43/267; B05D 1/18; B05D 1/26; B05D 5/12; B05D 2203/30; C01P 2006/10; C01P 2006/40

USPC ................. 428/403–407; 427/212–220, 581
See application file for complete search history.

(56) References Cited

U.S. PATENT DOCUMENTS

| | | |
|---|---|---|
| 3,103,975 A | 9/1963 | Hanson |
| 3,376,930 A | 4/1968 | Kiel et al. |
| 3,492,147 A | 1/1970 | Young et al. |
| 3,533,829 A | 10/1970 | Quanquin |
| 3,659,259 A | 4/1972 | Chaney, Jr. et al. |
| 3,772,589 A | 11/1973 | Scholberg |
| 3,929,191 A | 12/1975 | Graham et al. |
| 4,030,549 A | 6/1977 | Bouck |
| 4,068,718 A | 1/1978 | Cooke, Jr. et al. |
| 4,181,014 A | 1/1980 | Zuvela et al. |
| 4,401,162 A | 8/1983 | Osborne |
| 4,427,068 A | 1/1984 | Fitzgibbon |

(Continued)

FOREIGN PATENT DOCUMENTS

| | | |
|---|---|---|
| WO | 2014/004815 A1 | 1/2014 |
| WO | 2014/144917 A1 | 9/2014 |

OTHER PUBLICATIONS

International Search Report and Written Opinion for PCT/US2014/010228 prepared by the ISA/US on May 5, 2014 (9 pages).

(Continued)

*Primary Examiner* — Holly Le

(74) *Attorney, Agent, or Firm* — Patterson & Sheridan, LLP

(57) ABSTRACT

Electrically-conductive sintered, substantially round and spherical particles and methods for producing such electrically-conductive sintered, substantially round and spherical particles from an alumina-containing raw material. Methods for using such electrically-conductive sintered, substantially round and spherical particles in hydraulic fracturing operations.

20 Claims, 15 Drawing Sheets

(56) References Cited

U.S. PATENT DOCUMENTS

| | | |
|---|---|---|
| 4,440,866 A | 4/1984 | Lunghofer et al. |
| 4,491,796 A | 1/1985 | Smith |
| 4,550,779 A | 11/1985 | Zakiewicz |
| 4,567,945 A | 2/1986 | Segalman |
| 4,585,064 A | 4/1986 | Graham et al. |
| 4,613,161 A | 9/1986 | Brisco |
| 4,705,108 A | 11/1987 | Little et al. |
| 4,724,434 A | 2/1988 | Hanson et al. |
| 4,802,359 A | 2/1989 | Patrice |
| 4,806,928 A | 2/1989 | Veneruso |
| 4,839,644 A | 6/1989 | Safinya et al. |
| 4,851,781 A | 7/1989 | Marzetta et al. |
| 4,879,181 A | 11/1989 | Fitzgibbon |
| 4,901,069 A | 2/1990 | Veneruso |
| 4,942,926 A | 7/1990 | Lessi |
| 4,986,530 A | 1/1991 | Steinhilber |
| 5,008,661 A | 4/1991 | Raj |
| 5,038,107 A | 8/1991 | Gianzero et al. |
| 5,151,658 A | 9/1992 | Muramatsu et al. |
| 5,188,175 A | 2/1993 | Sweet |
| 5,200,705 A | 4/1993 | Clark et al. |
| 5,353,873 A | 10/1994 | Cooke, Jr. |
| 5,509,474 A | 4/1996 | Cooke, Jr. |
| 5,542,472 A | 8/1996 | Pringle et al. |
| 5,543,715 A | 8/1996 | Singer et al. |
| 5,547,029 A | 8/1996 | Rubbo et al. |
| 5,563,514 A | 10/1996 | Moulin |
| 5,576,703 A | 11/1996 | MacLeod et al. |
| 5,597,042 A | 1/1997 | Tubel et al. |
| 5,662,165 A | 9/1997 | Tubel et al. |
| 5,692,565 A | 12/1997 | MacDougall et al. |
| 5,945,923 A | 8/1999 | Soulier |
| 5,959,547 A | 9/1999 | Tubel et al. |
| 6,006,831 A | 12/1999 | Schlemmer et al. |
| 6,023,168 A | 2/2000 | Minerbo |
| 6,025,721 A | 2/2000 | Vail, III |
| 6,061,000 A | 5/2000 | Edwards |
| 6,070,662 A | 6/2000 | Ciglenec et al. |
| 6,116,342 A | 9/2000 | Clark et al. |
| 6,131,658 A | 10/2000 | Minear |
| 6,148,911 A | 11/2000 | Gipson et al. |
| 6,216,783 B1 | 4/2001 | Hocking et al. |
| 6,234,257 B1 | 5/2001 | Ciglenec et al. |
| 6,302,203 B1 | 10/2001 | Rayssiguier et al. |
| 6,330,914 B1 | 12/2001 | Hocking et al. |
| 6,378,610 B2 | 4/2002 | Rayssiguier et al. |
| 6,408,943 B1 | 6/2002 | Schultz et al. |
| 6,411,084 B1 | 6/2002 | Yoo |
| 6,426,917 B1 | 7/2002 | Tabanou et al. |
| 6,443,227 B1 | 9/2002 | Hocking et al. |
| 6,443,228 B1 | 9/2002 | Aronstam et al. |
| 6,474,415 B1 | 11/2002 | Ohmer |
| 6,538,576 B1 | 3/2003 | Schultz et al. |
| 6,597,178 B1 | 7/2003 | Nichols et al. |
| 6,626,238 B2 | 9/2003 | Hooper |
| 6,633,164 B2 | 10/2003 | Vinegar et al. |
| 6,684,952 B2 | 2/2004 | Brockman et al. |
| 6,691,779 B1 | 2/2004 | Sezginer et al. |
| 6,691,780 B2 | 2/2004 | Nguyen et al. |
| 6,693,553 B1 | 2/2004 | Ciglenec et al. |
| 6,719,055 B2 | 4/2004 | Mese et al. |
| 6,725,926 B2 | 4/2004 | Nguyen et al. |
| 6,725,930 B2 | 4/2004 | Boney et al. |
| 6,766,854 B2 | 7/2004 | Ciglenec et al. |
| 6,815,946 B2 | 11/2004 | Yoo |
| 6,856,255 B2 | 2/2005 | Chalitsios et al. |
| 6,864,801 B2 | 3/2005 | Tabanou et al. |
| 6,876,959 B1 | 4/2005 | Pierce et al. |
| 6,910,534 B2 | 6/2005 | Linyaev et al. |
| 6,943,697 B2 | 9/2005 | Ciglenec et al. |
| 6,959,773 B2 | 11/2005 | Mese et al. |
| 6,987,463 B2 | 1/2006 | Beique et al. |
| 7,000,697 B2 | 2/2006 | Goode et al. |
| 7,009,707 B2 | 3/2006 | Beresford et al. |
| 7,036,591 B2 | 5/2006 | Cannan et al. |
| 7,073,581 B2 | 7/2006 | Nguyen et al. |
| 7,082,993 B2 | 8/2006 | Ayoub et al. |
| 7,095,223 B2 | 8/2006 | Yoo |
| 7,140,434 B2 | 11/2006 | Chouzenoux et al. |
| 7,151,377 B2 | 12/2006 | Chouzenoux et al. |
| 7,168,487 B2 | 1/2007 | Salamitou et al. |
| 7,173,542 B2 | 2/2007 | Beique et al. |
| 7,187,961 B2 | 3/2007 | Yamashita et al. |
| 7,210,526 B2 | 5/2007 | Knobloch |
| 7,219,730 B2 | 5/2007 | Tilton et al. |
| 7,319,330 B2 | 1/2008 | Amundsen |
| 7,325,605 B2 | 2/2008 | Fripp et al. |
| 7,331,385 B2 | 2/2008 | Symington et al. |
| 7,398,680 B2 | 7/2008 | Glasbergen et al. |
| 7,424,911 B2 | 9/2008 | McCarthy et al. |
| 7,450,053 B2 | 11/2008 | Funk et al. |
| 7,451,812 B2 | 11/2008 | Cooper et al. |
| 7,453,768 B2 | 11/2008 | Hall et al. |
| 7,502,690 B2 | 3/2009 | Thomsen et al. |
| 7,568,532 B2 | 8/2009 | Kuckes et al. |
| 7,597,146 B2 | 10/2009 | Winslow et al. |
| 7,598,898 B1 | 10/2009 | Funk et al. |
| 7,602,688 B2 | 10/2009 | Lee |
| 7,631,691 B2 | 12/2009 | Symington et al. |
| 7,637,318 B2 | 12/2009 | Sierra et al. |
| 7,644,762 B2 | 1/2010 | Knobloch |
| 7,703,515 B2 | 4/2010 | Chouzenoux et al. |
| 7,712,527 B2 | 5/2010 | Roddy |
| 7,726,397 B2 | 6/2010 | McDaniel et al. |
| 7,728,900 B2 | 6/2010 | Fukushima et al. |
| 7,779,683 B2 | 8/2010 | Glasbergen et al. |
| 7,798,214 B2 | 9/2010 | Schmitt et al. |
| 7,836,952 B2 | 11/2010 | Fripp |
| 7,893,801 B2 | 2/2011 | Knobloch |
| 7,921,910 B2 | 4/2011 | Wilson et al. |
| 7,937,222 B2 | 5/2011 | Donadille et al. |
| 8,168,570 B2 | 5/2012 | Barron et al. |
| 8,633,700 B1 | 1/2014 | England et al. |
| 8,680,866 B2 | 3/2014 | Marsala et al. |
| 8,773,132 B2 | 7/2014 | Eick et al. |
| 8,812,237 B2 | 8/2014 | Wilt et al. |
| 8,826,982 B2 | 9/2014 | Tambini et al. |
| 8,931,553 B2 | 1/2015 | Cannan et al. |
| 2001/0033164 A1 | 10/2001 | Vinegar et al. |
| 2002/0000317 A1 | 1/2002 | Rayssiguier et al. |
| 2002/0145423 A1 | 10/2002 | Yoo |
| 2002/0174728 A1 | 11/2002 | Beresford et al. |
| 2002/0179301 A1 | 12/2002 | Schultz et al. |
| 2003/0094282 A1 | 5/2003 | Goode et al. |
| 2003/0106684 A1 | 6/2003 | Hooper |
| 2003/0205376 A1 | 11/2003 | Ayoub et al. |
| 2004/0239316 A1 | 12/2004 | Yoo |
| 2005/0017723 A1 | 1/2005 | Entov et al. |
| 2005/0274510 A1 | 12/2005 | Nguyen et al. |
| 2007/0269603 A1* | 11/2007 | Kubota .................. 427/304 |
| 2007/0278008 A1 | 12/2007 | Kuckes et al. |
| 2008/0230219 A1 | 9/2008 | Kaminsky |
| 2008/0248308 A1* | 10/2008 | Weintritt et al. ............ 428/407 |
| 2008/0264162 A1 | 10/2008 | Glasbergen et al. |
| 2008/0271885 A1 | 11/2008 | Kaminsky |
| 2008/0316049 A1 | 12/2008 | Verret et al. |
| 2009/0056938 A1 | 3/2009 | Treviranus et al. |
| 2009/0166030 A1 | 7/2009 | Zhuravlev et al. |
| 2009/0179649 A1 | 7/2009 | Schmidt et al. |
| 2009/0211754 A1 | 8/2009 | Verret et al. |
| 2009/0250216 A1 | 10/2009 | Bicerano |
| 2009/0288820 A1 | 11/2009 | Barron et al. |
| 2010/0044034 A1 | 2/2010 | Bailey et al. |
| 2010/0051266 A1 | 3/2010 | Roddy et al. |
| 2010/0066560 A1 | 3/2010 | McDaniel et al. |
| 2010/0078169 A1 | 4/2010 | Symington et al. |
| 2010/0101793 A1 | 4/2010 | Symington et al. |
| 2010/0102986 A1 | 4/2010 | Benischek et al. |
| 2010/0147512 A1 | 6/2010 | Cramer et al. |
| 2010/0223988 A1 | 9/2010 | Crow et al. |
| 2010/0234249 A1 | 9/2010 | McDaniel et al. |
| 2010/0250207 A1 | 9/2010 | Rodney |
| 2010/0282460 A1 | 11/2010 | Stone et al. |
| 2010/0314108 A1 | 12/2010 | Crews et al. |

(56) References Cited

U.S. PATENT DOCUMENTS

| | | |
|---|---|---|
| 2011/0056687 A1 | 3/2011 | Fripp |
| 2011/0120710 A1 | 5/2011 | Dong et al. |
| 2012/0146648 A1 | 6/2012 | Eick et al. |
| 2012/0181020 A1 | 7/2012 | Barron et al. |
| 2013/0138408 A1 | 5/2013 | Lee et al. |
| 2013/0169278 A1 | 7/2013 | Bittar et al. |
| 2013/0300419 A1 | 11/2013 | Hibbs |
| 2014/0011034 A1* | 1/2014 | Majumder et al. ........... 428/406 |
| 2014/0041862 A1 | 2/2014 | Ersoz |
| 2014/0184228 A1 | 7/2014 | Fu et al. |
| 2014/0190686 A1 | 7/2014 | Cannan et al. |
| 2014/0239957 A1 | 8/2014 | Zhang et al. |
| 2014/0361777 A1 | 12/2014 | Marsala et al. |
| 2014/0374091 A1 | 12/2014 | Wilt et al. |

OTHER PUBLICATIONS

Bartel, L.C., McCann, R.P., and Keck, L.J., Use of potential gradients in massive hydraulic fracture mapping and characterization, 51st Annual Fall Technical Conference and Exhibition of Society of Petroleum Engineers, New Orleans, Oct. 3-6, 1976 SPE 6090.

Bartel, L.C., Application of EM Holographic Methods to Borehole Vertical Electric Source Data to Map a Fuel Oil Spill, Sandia National Laboratories, 1993.

Lee, K.H., et al., A new approach to modeling the electromagnetic response to conductive media, Geophysics, vol. 54, No. 9 (1989).

Lee, K.H., et al., Tomographic Imaging of Electrical Conductivity of Using Low-Frequency Electromagnetic Fields, Lawrence Berkeley Lab, 1992.

Al-Ali, Z.A., et al., Looking Deep into the Reservoir, Official Review, Summer 2009: 21, No. 2.

Rassenfoss, Stephen, Illuminating the Reservoir, Journal of Petroleum Technology, Jun. 2012.

Aderibigbe, Aderonke, et al., Detection of Propping Agents in Fractures Using Magnetic Susceptibility Measurements Enhanced by Magnetic Nanoparticles, Paper SPE 170818, presented at the SPE Annual Technical Conference and Exhibition: Society of Petroleum Engineers, Amsterdam, The Netherlands, Oct. 27-29, 2014.

* cited by examiner

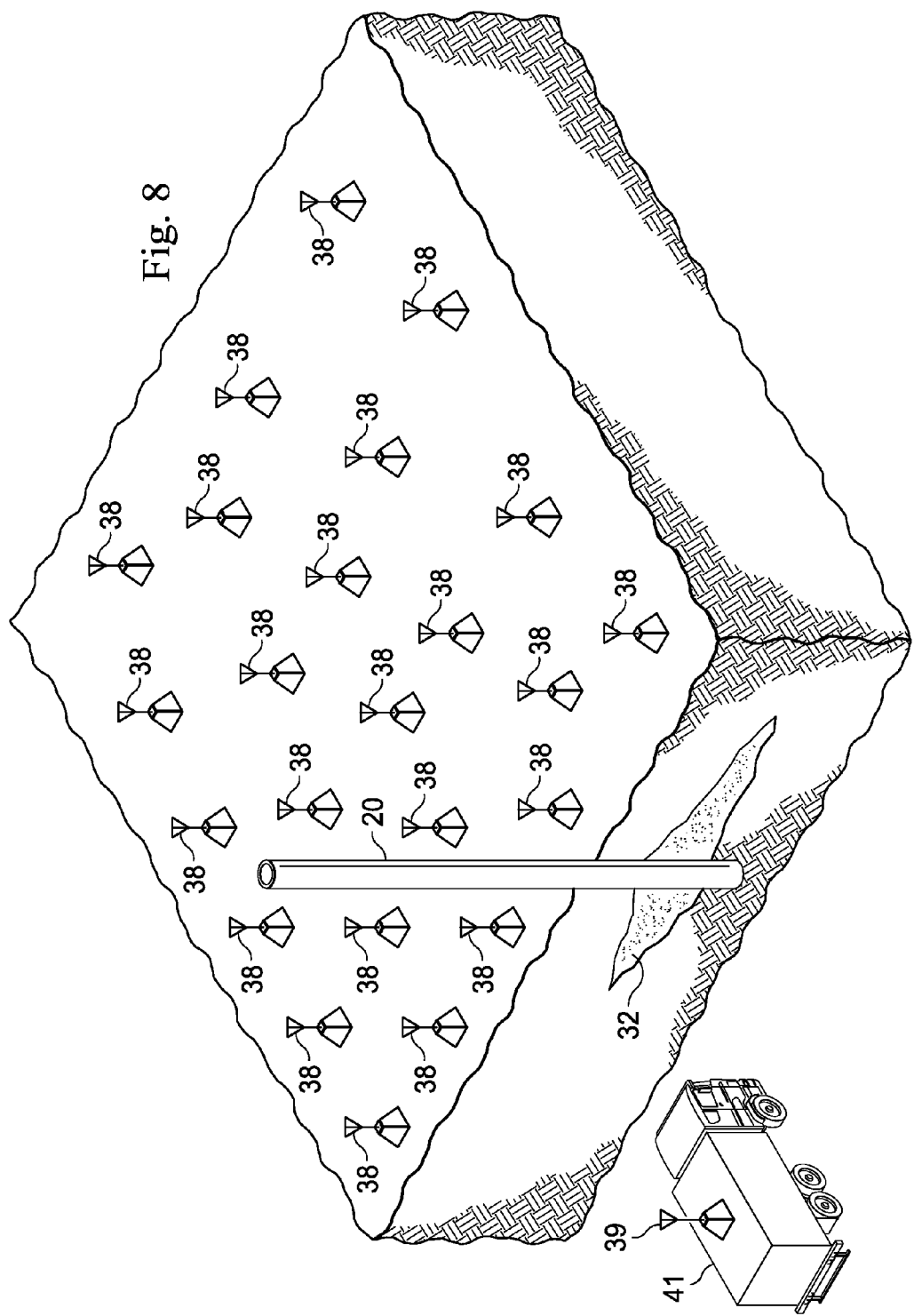

ELECTRICALLY-CONDUCTIVE PROPPANT AND METHODS FOR MAKING AND USING SAME

STATEMENT OF GOVERNMENTAL INTEREST

This invention was made under a CRADA (SC11/01780.00) between CARBO Ceramics, Inc. and Sandia National Laboratories, operated for the United States Department of Energy. The Government has certain rights in this invention.

BACKGROUND

Embodiments of the present invention relate generally to hydraulic fracturing of geological formations, and more particularly to electrically-conductive proppants used in the hydraulic fracture stimulation of gas, oil, or geothermal reservoirs. Methods described herein involve making the electrically-conductive proppants for use in electromagnetic methods for detecting, locating and characterizing such proppants.

In order to stimulate and more effectively produce hydrocarbons from downhole formations, especially formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particles, and the fluid used to pump these solids downhole is usually designed to be sufficiently viscous such that the proppant particles remain entrained in the fluid as it moves downhole and out into the induced fractures. Prior to producing the fractured formations, materials called "breakers", which are also pumped downhole in the frac fluid slurry, reduce the viscosity of the frac fluid after a desired time delay, enabling these fluids to be easily removed from the fractures during production, leaving the proppant particles in place in the induced fractures to keep them from closing and thereby substantially precluding production fluid flow there through.

The proppants can also be placed in the induced fractures with a low viscosity fluid in fracturing operations referred to as "water fracs" or "slick water fracs". The fracturing fluid in water fracs is water with little or no polymer or other additives. Water fracs are advantageous because of the lower cost of the fluid used. Also when using cross-linked polymers, it is essential that the breakers be effective or the fluid cannot be recovered from the fracture, effectively restricting flow of formation fluids. Water fracs, because the fluid is not cross-linked, do not rely on the effectiveness of breakers.

Commonly used proppants include naturally occurring sands, resin coated sands, and ceramic proppants. Ceramic proppants are typically manufactured from naturally occurring materials such as kaolin and bauxitic clays, and offer a number of advantages compared to sands or resin coated sands principally resulting from the compressive strength of the manufactured ceramics and their highly spherical particle shape.

Although induced fracturing has been a highly effective tool in the production of hydrocarbon reservoirs, the amount of stimulation provided by this process depends to a large extent upon the ability to generate new fractures, or to create or extend existing fractures, as well as the ability to maintain connection to the fractures through appropriate placement of the proppant. Without appropriate placement of the proppant, fractures generated during the hydraulic fracturing can tend to close, thereby diminishing the benefits of the hydraulic fracturing treatment. However, reliable methods for detecting, locating and characterizing the placement of proppant within fractures at relatively far distances from the wellbore and thus confirming whether or not such placement has been appropriate are not available.

Current state of the art proppant identification techniques are limited to relatively short distances (12 inches to 18 inches maximum) from the wellbore. Radioactive and non-radioactive tracers and proppants are currently used to infer the presence of proppant in the near well bore region. A better understanding of proppant placement in the far field regions of a hydraulic fracture is needed.

Previous work for massive hydraulic fracture mapping is summarized in Bartel, L. C., McCann, R. P., and Keck, L. J., Use of potential gradients in massive hydraulic fracture mapping and characterization, prepared for the 51st Annual Fall Technical Conference and Exhibition of Society of Petroleum Engineers, New Orleans, Oct. 3-6, 1976 paper SPE 6090. In this previous work, the electric potential differences were measured between two concentric circles of voltage electrodes around a vertical fracture well at the earth's surface. The well was electrically energized at the top of the well casing or at the depth of the fracture. The electrical ground was established at a well located at a distance of approximately one mile from the fracture well. At that time, the fact that the grounding wire acted as a transmitting antenna was not taken into account. The water used for the fracture process contained potassium chloride (KCl) to enhance its electrical conductivity and the fracture was propped using non-conducting sand. A 1 Hz repetition rate square wave input current waveform was used and only the voltage difference amplitudes were measured. Voltages using an elementary theory based on current leakage from the well casing and the fracture into a homogeneous earth were used to produce expected responses. Comparing the field data to results from the elementary model showed that a fracture orientation could be inferred, however, since the model did not account for the details of the fracture, other fracture properties could not be determined using the elementary model.

A method of detecting, locating and characterizing the location of the proppant as placed in a hydraulic fracture at distances of more than several inches from the cased wellbore is currently unavailable and would be beneficial. A need exists, therefore, for a proppant particle that can be detected and located in a hydraulic fracture. It would be particular desirable to obtain a proppant particle that is suitable for propping open a fracture and being detected in the fracture after a period of time. It would also be desirable to obtain an economical method of making such a detectable proppant particle.

BRIEF DESCRIPTION OF THE DRAWINGS

The invention may best be understood by referring to the following description and accompanying drawings that are used to illustrate embodiments of the invention. In the drawings:

FIG. 8 is a schematic perspective illustration of a hydraulic fracture mapping system.

DETAILED DESCRIPTION

Figure 1:
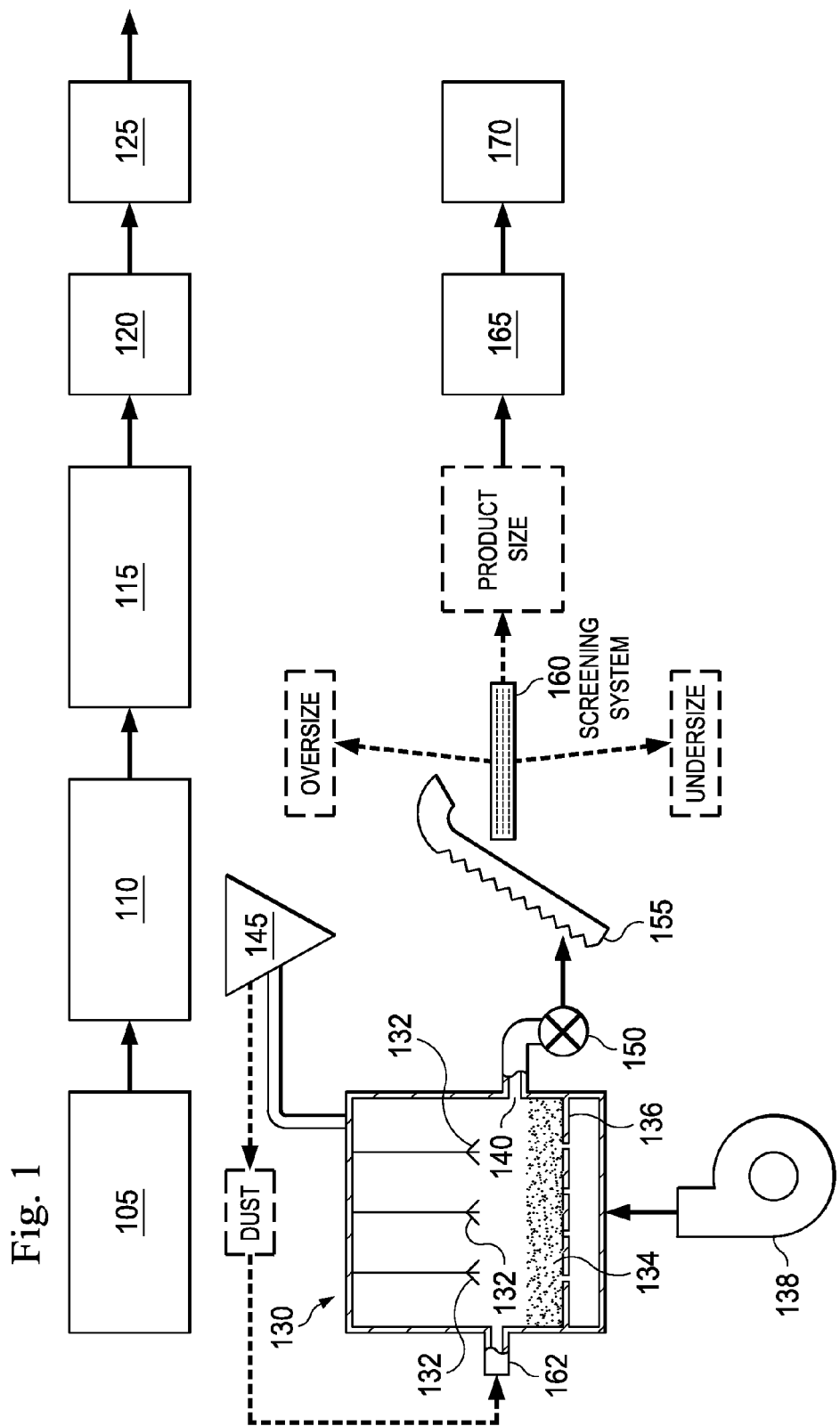
FIG. 1 is a schematic illustration of a system for preparing substantially round and spherical particles from a slurry as described herein.

In the following description, numerous specific details are set forth. However, it is understood that embodiments of the invention may be practiced without these specific details. In other instances, well-known structures and techniques have not been shown in detail in order not to obscure the understanding of this description.

Described herein are electromagnetic (EM) methods for detecting, locating, and characterizing electrically-conductive proppants used in the hydraulic fracture stimulation of gas, oil, or geothermal reservoirs. Also described herein are electrically-conductive sintered, substantially round and spherical particles and methods for preparing such electrically-conductive sintered, substantially round and spherical particles from a slurry of an alumina-containing raw material for use as proppants in the electromagnetic methods. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

According to embodiments of the present invention, the electrically-conductive sintered, substantially round and spherical particles, referred to hereinafter as "electrically-conductive proppant" may be made from a conventional proppant such as a ceramic proppant, resin-coated ceramic proppant, sand, resin-coated sand, plastic beads and glass beads. Such conventional proppants can be manufactured according to any suitable process including, but not limited to continuous spray atomization, spray fluidization, spray drying, or compression. Suitable conventional proppants and methods for their manufacture are disclosed in U.S. Pat. Nos. 4,068,718, 4,427,068, 4,440,866, 5,188,175, and 7,036,591, the entire disclosures of which are incorporated herein by reference.

Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 g/cm$^3$ and are typically made from kaolin clay and other alumina, oxide, or silicate ceramics. Intermediate density proppants generally have an apparent specific gravity of about 3.1 to 3.4 g/cm$^3$ and are typically made from bauxitic clay. High strength proppants are generally made from bauxitic clays with alumina and have an apparent specific gravity above 3.4 g/cm$^3$.

Sintered, substantially round and spherical particles can be prepared from a slurry of alumina-containing raw material. In certain embodiments, the particles have an alumina content of from about 40% by weight (wt %) to about 55 wt %. In certain other embodiments, the sintered, substantially round and spherical particles have an alumina content of from about 41.5 wt % to about 49 wt %.

In certain embodiments, the sintered, substantially round and spherical particles have a bulk density of from about 1 g/cm$^3$, about 1.15 g/cm$^3$, about 1.25 g/cm$^3$, or about 1.35 g/cm$^3$ to about 1.55 g/cm$^3$, about 1.75 g/cm$^3$, about 2 g/cm$^3$, or about 2.5 g/cm$^3$. The term "bulk density," as used herein, refers to the weight per unit volume, including in the volume considered, the void spaces between the particles. In certain other embodiments, the particles have a bulk density of from about 1.40 g/cm$^3$ to about 1.50 g/cm$^3$.

According to several exemplary embodiments, the substantially round and spherical particles have any suitable permeability and fluid conductivity in accordance with ISO 13503-5: "Procedures for Measuring the Long-term Conductivity of Proppants," and expressed in terms of Darcy units, or Darcies (D). The particles can have a long term permeability at 7,500 psi of at least about 1 D, at least about 2 D, at least about 5 D, at least about 10 D, at least about 20 D, at least about 40 D, at least about 80 D, at least about 120 D, or at least about 150 D. The particles can have a long term permeability at 12,000 psi of at least about 1 D, at least about 2 D, at least about 3 D, at least about 4 D, at least about 5 D, at least about 10 D, at least about 25 D, or at least about 50 D. The particles can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, the particles can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

In certain embodiments, the sintered, substantially round and spherical particles have a crush strength at 10,000 psi of from about 5% to about 8.5%, and a long-term fluid conductivity at 10,000 psi of from about 2500 mD-ft to about 3000 mD-ft. In certain other embodiments, the sintered, substantially round and spherical particles have a crush strength at 10,000 psi of from about 5% to about 7.5%.

The sintered, substantially round and spherical particles can have any suitable apparent specific gravity. In one or more exemplary embodiments, the sintered, substantially round and spherical particles have an apparent specific gravity of less than 5, less than 4.5, less than 4.2, less than 4, less than 3.8, less than 3.5, or less than 3.2. In still other embodiments, the sintered, substantially round and spherical particles have an apparent specific gravity of from about 2.50 to about 3.00, about 2.75 to about 3.25, about 2.8 to about 3.4, about 3.0 to about 3.5, or about 3.2 to about 3.8. The term "apparent specific gravity," (ASG) as used herein, refers to a number without units that is defined to be numerically equal to the weight in grams per cubic centimeter of volume, including void space or open porosity in determining the volume.

The sintered, substantially round and spherical particles can have any suitable size. According to one or more exemplary embodiments, the substantially round and spherical particles can have a size of at least about 100 mesh, at least about 80 mesh, at least about 60 mesh, at least about 50 mesh, or at least about 40 mesh. For example, the substantially round and spherical particles can have a size from about 115 mesh to about 2 mesh, about 100 mesh to about 3 mesh, about 80 mesh to about 5 mesh, about 80 mesh to about 10 mesh, about 60 mesh to about 12 mesh, about 50 mesh to about 14 mesh, about 40 mesh to about 16 mesh, or about 35 mesh to about 18 mesh. In a particular embodiment, the substantially round and spherical particles have a size of from about 20 to about 40 U.S. Mesh.

Suitable ceramic proppants can also include proppants manufactured according to vibration-induced dripping methods, herein called "drip casting." Suitable drip casting methods and proppants made therefrom are disclosed in U.S. Pat. Nos. 8,865,631 and 8,883,693, U.S. Patent Application Publication No. 2012/0227968, and U.S. patent application Ser. No. 14/502,483, the entire disclosures of which are incorporated herein by reference. Proppants produced from the drip cast methods can have a specific gravity of at least about 2.5, at least about 2.7, at least about 3, at least about 3.3, or at least about 3.5. Proppants produced from the drip cast methods can have a specific gravity of less than 5, less than 4.5, or less than 4. The drip cast proppants can also have a surface roughness of less than 5 µm, less than 4 µm, less than 3 µm, less than 2.5 µm, less than 2 µm, less than 1.5 µm, or less than 1 µm. In one or more exemplary embodiments, the drip cast proppants have an average largest pore size of less than about 25 µm, less than about 20 µm, less than about 18 µm, less than about 16 µm, less than about 14 µm, or less than about 12 µm and/or a standard deviation in pore size of less than 6 µm, less than 4 µm, less than 3 µm, less than 2.5 µm, less than 2 µm, less than 1.5 µm, or less than 1 µm. In one or more exemplary embodiments, the drip cast proppants have less than 5,000, less than 4,500, less than 4,000, less than 3,500, less than 3,000, less than 2,500, or less than 2,200 visible pores at a magnification of 500× per square millimeter of proppant particulate.

The ceramic proppants, produced by the drip casting methods or the conventional methods, can have any suitable composition. The ceramic proppant can be or include silica and/or alumina in any suitable amounts. According to one or more embodiments, the ceramic proppant includes less than 80 wt %, less than 60 wt %, less than 40 wt %, less than 30 wt %, less than 20 wt %, less than 10 wt %, or less than 5 wt % silica based on the total weight of the ceramic proppant. According to one or more embodiments, the ceramic proppant includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the ceramic proppant includes at least about 30 wt %, at least about 50 wt %, at least about 60 wt %, at least about 70 wt %, at least about 80 wt %, at least about 90 wt %, or at least about 95 wt % alumina based on the total weight of the ceramic proppant. According to one or more embodiments, the ceramic proppant includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina. In one or more embodiments, the ceramic proppant produced by the processes disclosed herein can include alumina, bauxite, or kaolin, or any mixture thereof. For example, the ceramic proppant can be composed entirely of or composed essentially of alumina, bauxite, or kaolin, or any mixture thereof. The term "kaolin" is well known in the art and can include a raw material having an alumina content of at least about 40 wt % on a calcined basis and a silica content of at least about 40 wt % on a calcined basis. The term "bauxite" is well known in the art and can be or include a raw material having an alumina content of at least about 55 wt % on a calcined basis.

An electrically-conductive material such as a metal, a conductive polymer, conductive carbonaceous material such as graphene, or a conductive nanoparticle can be added at any suitable stage in the manufacturing process of any one of these proppants to result in proppant suitable for use according to certain embodiments of the present invention. The electrically-conductive material can also be added to any one of these proppants after manufacturing of the proppants. Suitable metals include aluminum, tin, zinc, copper, silver, nickel, gold, platinum, palladium, rhodium and the like and can be added to result in an electrically-conductive proppant having any suitable metal content. The electrically-conductive proppant can have an electrically-conductive metal concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt %.

Suitable conductive polymers include poly(3,4-ethylenedioxythiophene) poly(styrenesulfonate) (PEDOT:PSS), polyanilines (PANI), polypyrroles (PPY) and the like and can be added to result in an electrically-conductive proppant having any suitable conductive polymer content. The electrically-conductive proppant can have a conductive polymer concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt %.

Suitable PEDOT:PSS, PANI and PYY conductive polymers are commercially available from Sigma-Aldrich. Certain specific embodiments of processes for coating proppant with a conductive polymer are described below in Example 2.

Suitable conducting nanoparticles include graphite, graphene, single or double-walled carbon nanotubes, or other material that when present in the nanoscale particle size range exhibits sufficient electrical conductivity to permit detection in the present invention. Such conducting nanoparticles can be added to result in a proppant having a conducting nanoparticle content of from about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, or about 14 wt % based on the weight of the electrically-conductive proppant.

Ceramic proppant may also be manufactured in a manner that creates porosity in the proppant grain. A process to manufacture a suitable porous ceramic proppant is described in U.S. Pat. No. 7,036,591, the entire disclosure of which is incorporated herein by reference. In this case the electrically-conductive material can be impregnated into the pores of the proppant grains to a concentration of about 0.01 wt %, about 0.05 wt %, about 0.1 wt %, about 0.5 wt %, about 1 wt %, about 2 wt %, or about 5 wt % to about 6 wt %, about 8 wt %, about 10 wt %, about 12 wt %, about 15 wt %, or about 20 wt % based on the weight of the electrically-conductive proppant. Water soluble coatings such as polylactic acid can be used to coat these particles to allow for delayed/timed release of conducting nano-particles for detection at different stages of the fracture treatment.

The ceramic proppants can have any suitable porosity. The ceramic proppants can include an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, or about 45% or more. In several exemplary embodiments, the internal interconnected porosity of the ceramic proppants is from about 5 to about 35%, about 5 to about 15%, or about 15 to about 35%. According to several exemplary embodiments, the ceramic proppants have any suitable average pore size. For example, the ceramic proppant can have an average pore size from about 2 nm, about 10 nm, about 15 nm, about 55 nm, about 110 nm, about 520 nm, or about 1,100 nm to about 2,200 nm, about 5,500 nm, about 11,000 nm, about 17,000 nm, or about 25,000 nm or more in its largest dimension. For example, the ceramic proppant can have an average pore size from about 3 nm to about 30,000 nm, about 30 nm to about 18,000 nm, about 200 nm to about 9,000 nm, about 350 nm to about 4,500 nm, or about 850 nm to about 1,800 nm in its largest dimension. According to certain embodiments described herein, the sintered, substantially round and spherical particles are made in a continuous process, while in other embodiments, the particles are made in a batch process.

In one or more exemplary embodiments, the electrically-conductive material can be added to a ceramic proppant in its method of manufacture. Referring now to FIG. 1, an exemplary system for implementing a continuous process for preparing sintered, substantially round and spherical particles from a slurry is illustrated. The exemplary system illustrated in FIG. 1 is similar in configuration and operation to that described in U.S. Pat. No. 4,440,866, the entire disclosure of which is incorporated herein by reference. The operations performed by the exemplary system illustrated in FIG. 1 can also be used to make the particles according to a batch process, as described in Example 1 below.

In the system illustrated in FIG. 1, an alumina-containing raw material having an alumina content of from about 40% to about 55% by weight (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder may be bypassed. Raw material fed through a shredder such as is illustrated in FIG. 1, is referred to as "treated" raw material.

In certain embodiments, the shredder breaks apart and slices the alumina-containing raw material so as to yield pieces having a diameter of less than about five inches, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well-known to those of ordinary skill in the art.

The treated or untreated alumina-containing raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well-known to those of ordinary skill in the art.

In certain embodiments, the electrically-conductive material is added to the alumina-containing raw material and water in the blunger 110 to result in an electrically-conductive material concentration of about 0.1% to about 10.0% or about 5.0% to about 10.0% by weight of the solids content in the slurry or just prior to the formation of pellets as described below.

A sufficient amount of water is added to the blunger 110 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well-known and understood by those of ordinary skill in the art.

In certain embodiments, a dispersant is added to the slurry in the blunger 110 to adjust the viscosity of the slurry to a target range as discussed further below. In other embodiments, the viscosity of the slurry in the blunger 110 is adjusted to the target range by the addition of a dispersant and a pH-adjusting reagent.

A dispersant may be added to the slurry prior to the addition of the electrically-conductive material or other additives. In certain embodiments, the composition includes a dispersant in an amount of from about 0.15% to about 0.30% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the alumina-containing raw material, electrically-conductive material, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder is added in an amount of from about 0.2% to about 5.0% by weight, based on the total dry weight of the alumina-containing raw material and the electrically-conductive material. In certain embodiments, the binder is added in an amount of from about 0.2% to about 3.0% by weight based on the total dry weight of the alumina-containing raw material and the electrically-conductive material. Suitable binders include but are not limited to polyvinyl acetate, polyvinyl alcohol (PVA), methylcellulose, dextrin and molasses. In certain embodiments, the binder is PVA having a molecular weight of from about 20,000 to 100,000 $M_n$. "$M_n$" represents the number average molecular weight which is the total weight of the polymeric molecules in a sample, divided by the total number of polymeric molecules in that sample.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in FIG. 1, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 115.

From the tank 115, the slurry is fed to a heat exchanger 120, which heats the slurry to a temperature of from about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized alumina-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to FIG. 1, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in FIG. 1), which is a pressure nozzle of conventional design. In other embodiments, one or more two-fluid nozzles are suitable. The design of such nozzles is well-known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed comprises from about 5% to about 20% of the total volume of a green pellet formed therefrom. Slurry is sprayed, under pressure, through the atomizing nozzles 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in FIG. 1, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to one such embodiment, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to FIG. 1, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversize fraction, a product fraction, and an undersize fraction.

The oversize fraction exiting the screening unit 160 includes those green pellets that are larger than the desired product size. In a continuous process, the oversize green pellets may be recycled to tank 115, where at least some of the oversize green pellets can be broken down and blended with slurry in the tank. Alternatively, oversize green pellets can be broken down and recycled to the particle bed 134 in the fluidizer 130. The undersize fraction exiting the screening system 160 includes those green pellets that are smaller than the desired product size. In a continuous process, these green pellets may be recycled to the fluidizer 130, where they can be fed through an inlet 162 as seeds or as a secondary feed to the fluidizer 130.

The product fraction exiting the screening system 160 includes those green pellets having the desired product size. These green pellets are sent to a pre-sintering device 165, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 170, in which the green pellets are sintered for a period of time sufficient to enable recovery of sintered, substantially round and spherical particles having one or more of a desired apparent specific gravity, bulk density, and crush strength. Alternatively, the pre-sintering device 165 can be eliminated if the sintering device 170 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particles. In some embodiments, sintering device 170 is a rotary kiln, operating at a temperature of from about 1000° C. to about 1600° C., for a period of time from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particles exit the sintering device 170, they can be further screened for size, and tested for quality control purposes. Inert atmosphere sintering can be used to limit or prevent the oxidation of the electrically-conductive material. Techniques for replacing the oxygen rich atmosphere in the sintering device with an inert gas such as argon, nitrogen, or helium are well-known to those of ordinary skill in the art. Generally, oxygen is replaced with an inert gas such that 0.005% oxygen or less remains in the sintering atmosphere.

According to certain embodiments of the present invention, the electrically-conductive material is coated onto the proppants. For example, the electrically-conductive material can be coated onto ceramic proppant after the proppant particles exit sintering device 170 and have been further screened for size, and tested for quality control measures. The coating may be accomplished by any coating technique well-known to those of ordinary skill in the art such as spraying, sputtering, vacuum deposition, dip coating, extrusion, calendaring, powder coating, transfer coating, air knife coating, roller coating, electroless plating (such as disclosed in U.S. Pat. Nos. 3,296,012, 4,812,202, and 3,617,343, the entire disclosures of which are hereby incorporated by reference), electroplating and brush coating.

According to several exemplary embodiments, the electrically-conductive material is deposited as a coating on the ceramic proppant or natural sands. Processes for electrolytic and electroless coating are well-known to those of ordinary skill in the art. For example, see U.S. Pat. No. 3,556,839, the entire disclosure of which is hereby incorporated by reference.

According to several exemplary embodiments and in accordance with conventional autocatalytic plating methods, a non-conductive substrate, such as a ceramic proppant sample, is suitably cleaned and roughened, then sensitized and activated by successive immersions in an aqueous solution of a reducing agent and solutions of catalytic metal such as stannous chloride and palladium chloride and rinsing in water following each such immersion. Thereafter, the substrate can be immersed in the plating bath heated to a temperature of between 55-95° C. The bath can include, for example, an aqueous solution containing a salt of nickel and a phosphorous-containing reducing agent such as sodium hypophosphite in the presence of salts such as sodium citrate and sodium acetate, where the pH of the solution is adjusted to a value of between 4 and 6. Those of ordinary skill in the art will understand that any conventional electroless nickel, copper, silver or gold plating bath solution may be utilized such as those that are commercially available from suppliers such as Uyemura, Transene or Caswell. After immersion for a period of about 1 to about 30 minutes, the bath is substantially exhausted and a film of nickel ranging from about 0.5 to about 5 microns in thickness is deposited on the surface of the substrate.

According to several exemplary embodiments and in accordance with conventional electroless plating methods, a non-conductive substrate, such as a ceramic proppant sample, is suitably cleaned and then sensitized by successive immersions in an aqueous solution of catalytic metal and an aqueous solution of a reducing agent such as, for example, solutions of palladium chloride and stannous chloride, and rinsing in water following each such immersion. Thereafter, the substrate is immersed in the plating bath maintained at a temperature of between 25-65° C. The bath may include, for example, an aqueous solution containing a salt of copper and an alkali metal hydroxide in the presence of one or more salts such as potassium sodium tartrate and sodium carbonate. Those of ordinary skill in the art will understand that any conventional electroless nickel, copper, silver or gold plating bath solution can be utilized such as those that are commercially available from suppliers such as Uyemura, Transene or Caswell. After immersion for a period of about 1 to about 30 minutes, the bath is substantially exhausted and a film of copper ranging from about 0.5 to about 5 microns in thickness is deposited on the substrate.

The conventional autocatalytic plating methods, however, can use acidic palladium solutions that may oxidize active metal expressed in the native proppant surface and therefore can lead to poor deposition of metal onto the proppant surface. It has been found that incorporating a conditioning step into an electroless coating method can improve the deposition of metal onto the proppant surface.

Figure 2:
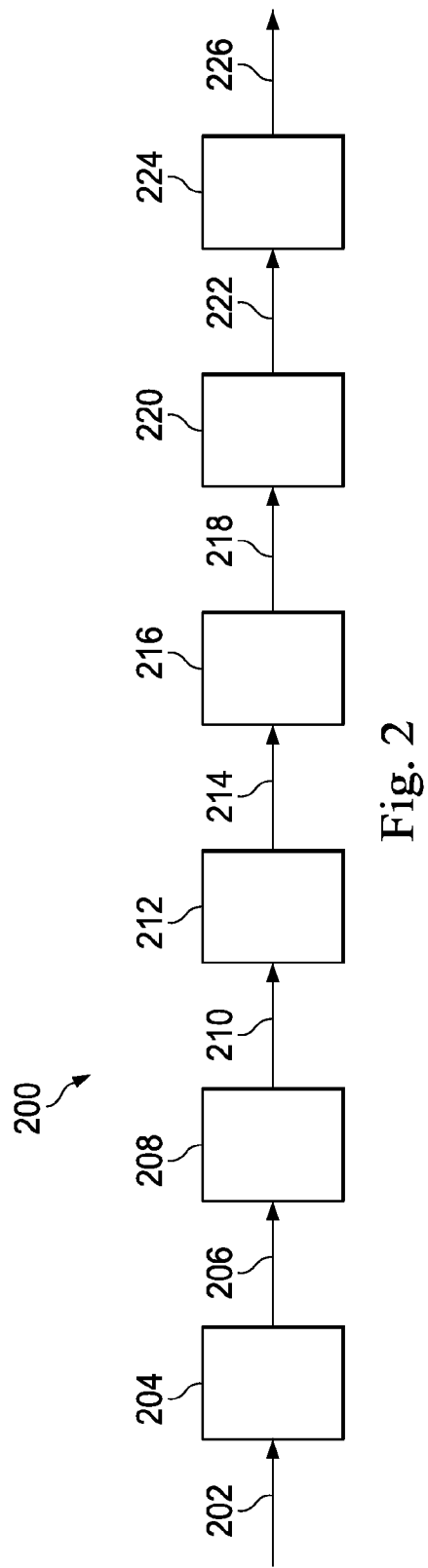
FIG. 2 is a flow chart showing steps of an electroless coating method for electrically-conductive material onto a proppant substrate.

Referring now to FIG. 2, a flow chart is depicted showing steps of a process 200 for electroless coating of the electrically-conductive material onto proppant utilizing a conditioning step. In the electroless coating process 200, a supply of proppant via line 202 can be introduced to one or more washing units 204 where the proppant via line 202 can be contacted with a first washing solution to remove dust and/or fines to provide a clean proppant via line 206. The washing unit 204 can be or include one or more tanks, one or more vessels, one or more conveyance systems, one or more conduits, or the like. The first washing solution can be or include an aqueous solution containing an acid or base, such as water containing dilute acid, or an organic phase solution, such as a liquid hydrocarbon, this washing can also be conducted at an elevated temperature. Clean proppant via line 206 can be withdrawn from the washing unit 204 and introduced to one or more pretreatment units 208 where the clean proppant via line 206 can be contacted with a conditioning solution. The pretreatment unit 208 can be or include one or more tanks, one or more vessels, one or more conveyance systems, one or more conduits, or the like. The conditioning solution can be or include an alkaline solution to adjust the pH of the surface of the proppant to alkaline levels (pH>7). The alkaline solution can include one or more of an hydroxide, ammonia, or a carbonate.

The conditioning in the pretreatment unit 108 can be further enhanced by combining or mixing a suitable surfactant with the conditioning solutions. Suitable surfactants can include, but are not limited to, anionic, cationic, nonionic, and amphoteric surfactants, or combinations thereof. According to several exemplary embodiments, suitable surfactants include but are not limited to saturated or unsaturated long-chain fatty acids or acid salts, long-chain alcohols, polyalcohols, polysorbates, dimethylpolysiloxane and polyethylhydrosiloxane. According to several exemplary embodiments, suitable surfactants include but are not limited to linear and branched carboxylic acids and acid salts having from about 4 to about 30 carbon atoms, linear and branched alkyl sulfonic acids and acid salts having from about 4 to about 30 carbon atoms, linear alkyl benzene sulfonate wherein the linear alkyl chain includes from about 4 to about 30 carbon atoms, sulfosuccinates, phosphates, phosphonates, phospholipids, ethoxylated compounds, carboxylates, sulfonates and sulfates, polyglycol ethers, amines, salts of acrylic acid, pyrophosphate and mixtures thereof. In one or more exemplary embodiments, the surfactant is a polysorbate, such as Tween™ 20 (PEG(20) sorbitan monolaurate).

The clean proppant via line 206 can contact the conditioning solution in the pretreatment unit 208 under any suitable conditions to provide a conditioned proppant via line 210. Suitable conditions can include a temperature of about 10° C., about 25° C., about 30° C., about 35° C., about 40° C., about 45° C. to about 47° C., about 50° C., about 55° C., about 60° C., about 75° C., or about 100° C. under a residence time of about 1 second (s), about 5 s, about 15 s, about 25 s, about 45 s, or about 55 s to about 65 s, about 75 s, about 100 s, about 2 minutes (min), about 5 min, or about 10 min. The conditioning solution can have a pH of at least about 7.2, at least about 8, at least about 8.5, at least about 9, at least about 10, at least about 11, at least about 12, at least about 12.5, or at least about 13.

The conditioned proppant via line 210 can be withdrawn from the pretreatment unit 208 and introduced to one or more turbidity reduction units 212 where the conditioned proppant via line 210 can be contacted with a second washing solution to further remove dust and/or fines to provide a washed proppant via line 214 having a reduced turbidity compared to the conditioned proppant via line 210. The turbidity reduction unit 212 can be or include one or more tanks, one or more vessels, one or more conveyance systems, one or more conduits, or the like. The second washing solution can be the same as or similar to the first washing solution and can include an aqueous solution, such as water, or an organic phase solution, such as a liquid hydrocarbon. The second washing solution can also have a sensitizer which aids the activator in the subsequent step. The sensitizer can be any agent that reduces the activator, such as tin chloride, sodium borohydride or sodium hypophosphite or any other known reducing agent. In one or more exemplary embodiments, the second washing solution does not contain the sensitizer. The sensitizer step would be followed by another rinse step, but in some embodiments may be omitted.

Washed proppant via line 214 can be withdrawn from the turbidity reduction unit 212 and introduced to one or more catalyst reduction units 216 where the washed proppant via line 214 can be contacted with an activation solution. The activation solution can activate the proppant by attaching catalytically active material, such as palladium or silver, to the proppant surface. The activation solution can be or include one or more palladium salts, such as palladium chloride or palladium ammonium chloride, and/or silver nitrate. The activation solution can be an aqueous phase solution or an organic phase solution. The activation solution can have a palladium salt concentration of about 0.1 milligrams of $Pd^{2+}$ per liter (mg/l), about 0.5 mg/l, about 1 mg/l, about 5 mg/l, about 10 mg/l, or about 20 mg/l to about 30 mg/l, about 35 mg/l, about 40 mg/l, about 50 mg/l, or about 100 mg/l. The activation solution can also contain a reducing agent, or sensitizer. The reducing agent can be or include a tin salt, such as stannous chloride. In one or more exemplary embodiments, the activation solution does not contain the reducing agent.

The washed proppant via line 214 can contact the activation solution in the catalyst reduction unit 216 under any suitable conditions to provide an activated proppant via line 218. Suitable conditions can include a temperature of about 20° C., about 35° C., about 50° C., about 65° C., about 75° C., about 78° C. to about 82° C., about 85° C., about 90° C., about 95° C., about 100° C., or about 105° C. under a residence time of about 1 min, about 2 min, about 3 min, about 4 min, about 5 min, or about 7 min to about 8 min, about 9 min, about 10 min, about 12 min, about 15 min, or about 20 min or more and/or until the bath is substantially exhausted. The activation solution can have a pH of about 7.1, about 7.2, about 7.4, about 7.6, or about 7.8 to about 8, about 8.5, about 9, about 9.5, about 10, about 11, about 12, or about 13 or more.

The activated proppant via line 218 can be withdrawn from the activation unit 216 and introduced to one or more rinse units 220 where the activated proppant via line 218 can be contacted with a third washing solution to remove excess activation solution from the activated proppant. The rinse unit 220 can be or include one or more tanks, one or more vessels, one or more conveyance systems, one or more conduits, or the like. The third washing solution can include an aqueous solution, such as tap water or de-ionized water.

Rinsed proppant via line 222 can be withdrawn from the rinse unit 220 and introduced to one more metallization units 224 where the rinsed proppant via line 222 can be subjected to metal plating. In the metallization unit 224, the rinsed proppant via line 222 can be immersed in a plating bath solution having a temperature of about 20° C., about 35° C., about 50° C., about 60° C., or about 70° C. to about 75° C., about 80° C., about 90° C., about 95° C., about 100° C., about 110° C., or about 120° C. or more under a residence time of about 1 min, about 2 min, about 4 min, about 8 min, about 12 min, or about 14 min to about 16 min, about 20 min, about 25 min, about 30 min, about 45 min, or about 60 min or more and/or until the bath is substantially exhausted. After immersion, a film of electrically-conductive material ranging from about 10 nanometers (nm), about 50 nm, about 100 nm, about 250 nm, or about 400 nm to about 500 nm, about 600 nm, about 700 nm, about 800 nm, about 900 nm, about 1,000 nm, or about 1,200 nm or more can be substantially uniformly coated onto the rinsed proppant to provide the electrically-conductive proppant.

The plating bath solution can be an aqueous solution containing water or an organic phase solution containing one or more hydrocarbons. The plating bath solution can be basic or acidic and can include a metal salt, a complexing agent, a reducing agent, and a buffer. For example, the plating bath solution can include a salt of nickel such as nickel sulfate, nickel sulphate hexahydrate, and nickel chloride. The complexing agent can include acetate, succinate, aminoacetate, malonate, pyrophosphate, malate, or citrate or any combination thereof. The reducing agent can include sodium borohydride, dimethylamine borane, or hydrazine or any combination thereof. The buffer can include acetic acid, propionic acid, glutaric acid, succinic acid, or adipic acid or any combination thereof. Those of ordinary skill in the art will understand that any conventional electroless nickel, copper, silver or gold plating bath solution can also be utilized such as those that are commercially available from suppliers such as Uyemura, Transene, Caswell, and Metal-Chem.

Figure 3:
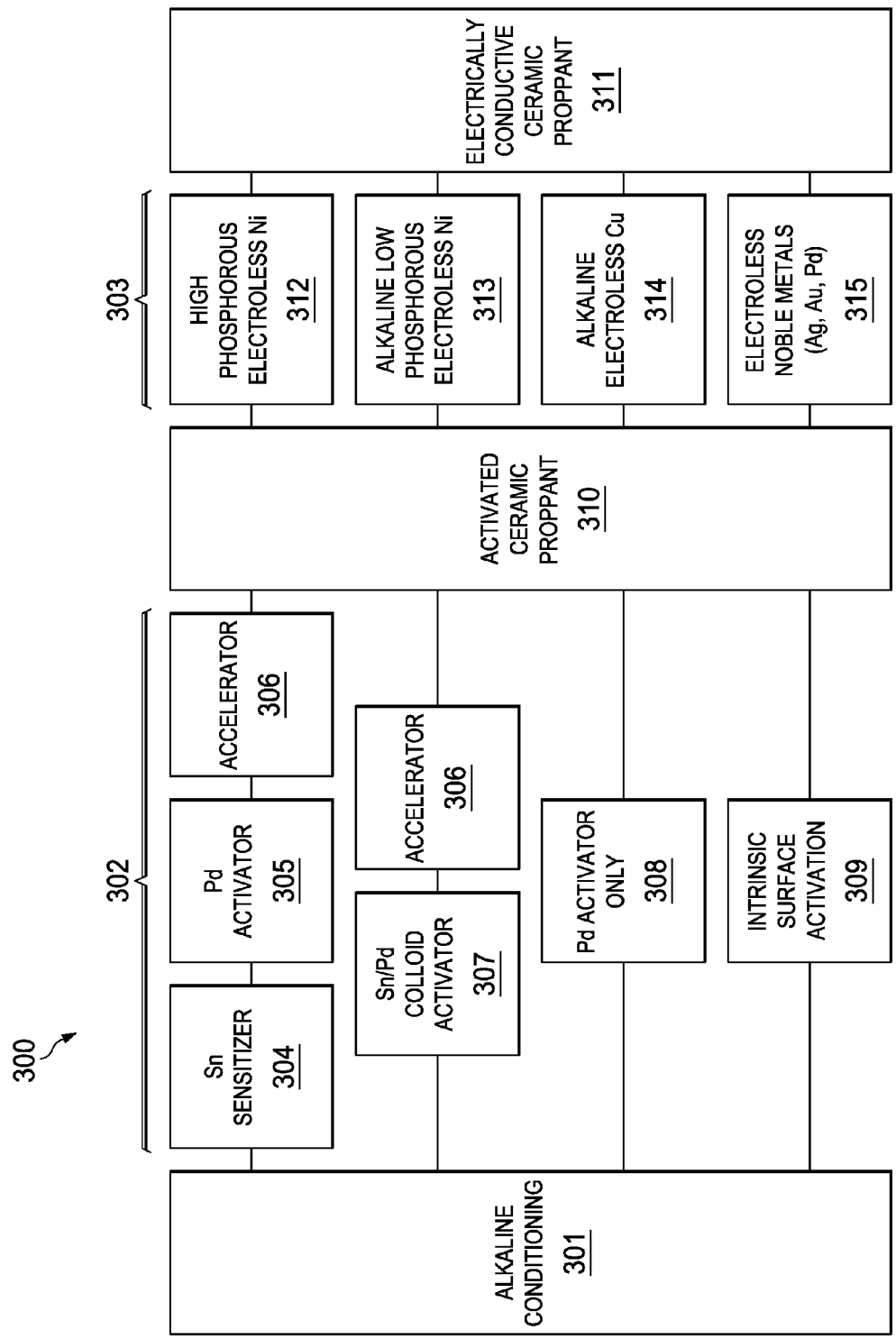
FIG. 3 is another flow chart showing alternative steps of an electroless coating method for electrically-conductive material onto a proppant substrate.

Additional and/or alternative steps can be employed in the electroless plating process. Referring now to FIG. 3, a flow chart is depicted showing steps of a process 300 for electroless coating of the electrically-conductive material onto proppant in which alternative activation and metal deposition steps are depicted. Proppant particles can be subjected to alkaline conditioning 301, which can be the same as or similar to the alkaline conditioning in the pretreatment unit 208, to provide conditioned proppant particles.

After being subjected to the alkaline conditioning step 301, the conditioned proppant particles can be subjected to an activation step 302 prior to electroless metal deposition 303. The conditioned particles can be sensitized using a sensitizer solution of tin(II) 304 to produce sensitized particles. After subsequent exposure to palladium(II) activator solution 305, palladium(II) is reduced to palladium metal ($Pd^{2+} \rightarrow Pd^0$ on the surface of the sensitized particles and tin(II) is oxidized to tin(IV) ($Sn^{2+} \rightarrow Sn^{4+}$). An accelerator solution 306 can be used to remove oxidized tin(IV) after exposure to palladium(II) activator solution 305 and prior to electroless metal deposition 303. Alternative embodiments involve a combined tin(IV) and palladium(II) activator and sensitizer colloidal suspension 307 which can be followed by the accelerator solution 306. The accelerator solution 306 can be an aqueous solution and can include one or more accelerator agents including, but not limited to, one or more organic sulfide compounds, such as bis(sodium-sulfopropyl) disulfide, 3-mercapto-1-propanesulfonic acid sodium salt, N,N-dimethyl-dithiocarbamyl propylsulfonic acid sodium salt or 3-S-isothiuronium propyl sulfonate, and mixtures thereof. Other suitable accelerator agents can include, but are not limited to, thiourea, allylthiourea, acetylthiourea, and pyridine and the like.

In certain embodiments, specific to proppant particle surfaces, the alkaline conditioning can enable activation using only the Pd activator as shown in step 308. The conditioned particles are activated using a solution of any suitable palladium salt, such as palladium chloride or palladium ammonium chloride, in a concentration of from about 0.1, about 0.5, about 1, about 5, about 10, about 15 or about 20 to about 25, about 30, about 35, about 40, or about 50 or more milligrams $Pd^{2+}$ per liter, where the pH of the solution can be adjusted between 7 and 14 using any suitable bases such as, for example, sodium hydroxide.

In one or more exemplary embodiments, intrinsic surface activation 309 can be accomplished prior to electroless metal deposition 303. In this embodiment, iron or any other suitable metal ion incorporated into the proppant particles during firing or sintering that are expressed at the surface of the proppant, can serve to directly activate the particles. In one or more exemplary embodiments, the surface of the particles is activated by soaking the particles in a reducing agent solution, such as sodium borohydride, sodium hypophosphite or sodium cyanoborohydride, where this solution can be transferred directly to the electroless plating bath with the particles still wet from the solution, or dried onto the particles prior to electroless metal plating 303, or rinsed completely from the particles.

Ceramic proppant particles can contain a significant amount of oxidized iron. In one or more exemplary embodiments of intrinsic surface activation 309, these iron moieties can be reduced to elemental iron, or other reduced form [iron (II)] which is catalytically active to copper, nickel and other noble metal electroless plating solutions. By utilizing the native iron content intrinsic to the particle, it is possible to plate onto the particles without Pd activators. The reduction of surface iron ions to atomic iron can occur within a sintering device, such as sintering device 170, or subsequent to sintering, by maintaining a reducing environment in the kiln, which is characterized by the presence of carbon monoxide or other products of partial combustion. Iron on the surface of the proppant particles can also be reduced after manufacturing by exposing the surfaces of the proppant particles to carbon monoxide or hydrogen at any suitable temperatures such as, for example, about 200° C., about 300° C., about 400° C., about 500° C., or about 600° C. to about 750° C., about 900° C., about 1,100° C., or about 1,500° C.

After particle activation 302, activated proppant 310 can be converted into electrically-conductive proppant 311 by electroless metal deposition 303. Processes for electrolytic and electroless coating are well-known to those of ordinary skill in the art. See, for example, U.S. Pat. No. 3,556,839, the entire disclosure of which is incorporated herein by reference. According to several exemplary embodiments, and in accordance with conventional autocatalytic or electroless plating methods, the activated proppant sample can be coated with metal and metal alloys by various methods.

After activation 302, the substrate can be immersed in, submerged in, or otherwise contacted with a plating bath of the electroless metal deposition 303 to provide the electrically-conductive proppant 311. The plating bath can be heated to a temperature of from about 35° C., about 45° C., about 55° C., about 65° C., or about 75° C. to about 85° C., about 95° C., about 105° C., or about 120° C. or more. In one or more embodiments, the plating bath can be or include an acidic, nickel-containing bath with a high phosphorous content (about 5 wt % to about 12 wt % phosphorous by weight of the resulting nickel-phosphorous alloy film) 312. The high phosphorous content bath can include, for example, an aqueous solution containing a salt of nickel and a phosphorous-containing reducing agent such as sodium hypophosphite in the presence of salts such as sodium citrate and sodium acetate. The pH of the high phosphorous content bath solution can be from about 2, about 3, about 3.5, about 4, or about 4.5 to about 5, about 5.5, about 6, or about 6.5.

In one or more embodiments, the plating bath can be an alkaline, nickel-containing bath 313 with a low phosphorous content (about >1 wt % to about 4.9 wt % phosphorous by weight of the resulting nickel-phosphorous alloy film). The pH of the alkaline plating bath 313 with a low phosphorous content can be from about 7, about 7.5, about 8, about 8.5, or about 9 to about 10, about 10.5, about 11, about 12, or about 13 or more. The alkaline plating bath 313 can chelate free nickel ions to prevent solution reactivity with Pd, as can occur with Pd solution drag out, and therefore offer a preferred reaction environment for high surface area materials such as ceramic proppant. Alkaline plating solutions can require relatively longer periods of time to plate, but can lead to thinner, contiguous coatings with higher conductivity which may enhance electromagnetic detection. Those of ordinary skill in the art will understand that any conventional electroless nickel, copper, silver or gold plating bath solution may be utilized with any range of pH such as those that are commercially available from suppliers such as Metal-Chem, Enthone, Uyemura, Transene or Caswell. In one or more exemplary embodiments, the plating bath can be or include alkaline electroless copper 314 containing formaldehyde as a reducing agent. In one or more exemplary embodiments, the plating bath can include electroless noble metals 315, such as silver, gold, and platinum. For example, the plating bath can be or include a silver nitrate solution.

The electrically-conductive proppant 311 can have any suitable film thickness of electrically-conductive material disposed on the outer surfaces thereof. In one or more embodiments, the film of electrically-conductive material can be from about 10 nm, about 50 nm, about 100 nm, about 250 nm, or about 400 nm to about 500 nm, about 600 nm, about 700 nm, about 800 nm, about 900 nm, about 1,000 nm, about 1,200 nm, about 1,500 nm, about 2,500 nm, or about 3,500 nm or more in thickness when substantially uniformly coated onto the proppant to provide the electrically-conductive ceramic proppant 311. In one or more exemplary embodiments, the thickness of the substantially uniform coating of electrically-conductive material can be from about 50 nm to about 150 nm, about 400 nm to about 600 nm, about 500 nm to about 1,200 nm, about 550 nm to about 700 nm, about 750 nm to about 1,200 nm, or about 750 nm to about 1,000 nm.

The electrically-conductive material can also be incorporated into a resin material. Ceramic proppant or natural sands can be coated with the resin material containing the electrically-conductive material such as metal clusters, metal flake, metal shot, metal powder, metalloids, metal nanoparticles, quantum dots, carbon nanotubes, buckminsterfullerenes, and other suitable electrically conductive materials to provide electrically-conductive material-containing proppant that can be detected by electromagnetic means. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also, a suitable hot melt coating procedure for utilizing phenol-formaldehyde novolac resins is described in U.S. Pat. No. 4,585,064, to Graham et al., the entire disclosure of which is incorporated herein by reference. Those of ordinary skill in the art will be familiar with still other suitable methods for resin coating proppants and natural sands.

The electrically-conductive proppant 311 can have any suitable electrical conductivity. In one or more exemplary embodiments, a pack of the electrically-conductive proppant 311 can have an electrical conductivity of at least about 1 Siemens per meter (S/m), at least about 5 S/m, at least about 15 S/m, at least about 50 S/m, at least about 100 S/m, at least about 250 S/m, at least about 500 S/m, at least about 750 S/m, at least about 1,000 S/m, at least about 1,500 S/m, or at least about 2,000 S/m. The electrical conductivity of the pack of the electrically-conductive proppant 311 can also be from about 10 S/m, about 50 S/m, about 100 S/m, about 500 S/m, about 1,000 S/m, or about 1,500 S/m to about 2,000 S/m, about 3,000 S/m, about 4,000 S/m, about 5,000 S/m, or about 6,000 S/m. The pack of the electrically-conductive proppant 311 can have any suitable resistivity. In one or more exemplary embodiments, the pack of the electrically-conductive proppant 311 can have a resistivity of less than 100 Ohm-cm, less than 80 Ohm-cm, less than 50 Ohm-cm, less than 25 Ohm-cm, less than 15 Ohm-cm, less than 5 Ohm-cm, less than 2 Ohm-cm, less than 1 Ohm-cm, less than 0.5 Ohm-cm, or less than 0.1 Ohm-cm.

In one or more exemplary embodiments, increasing a load or pressure onto the pack of the electrically-conductive proppant 311 by a factor of 2, a factor of 5, or a factor of 10 can increase the electrical conductivity of the pack of the electrically-conductive proppant 311 by at least about 50%, at least about 75%, at least about 100%, at least about 150%, or at least about 200%. In one or more exemplary embodiments, increasing a load or pressure onto the pack of the electrically-conductive proppant 311 by a factor of 2, a factor of 5, or a factor of 10 can decrease the resistivity of the pack of the electrically-conductive proppant 311 by from about 1%, about 2%, or about 5% to about 10%, about 15%, or about 25%.

Figure 4:
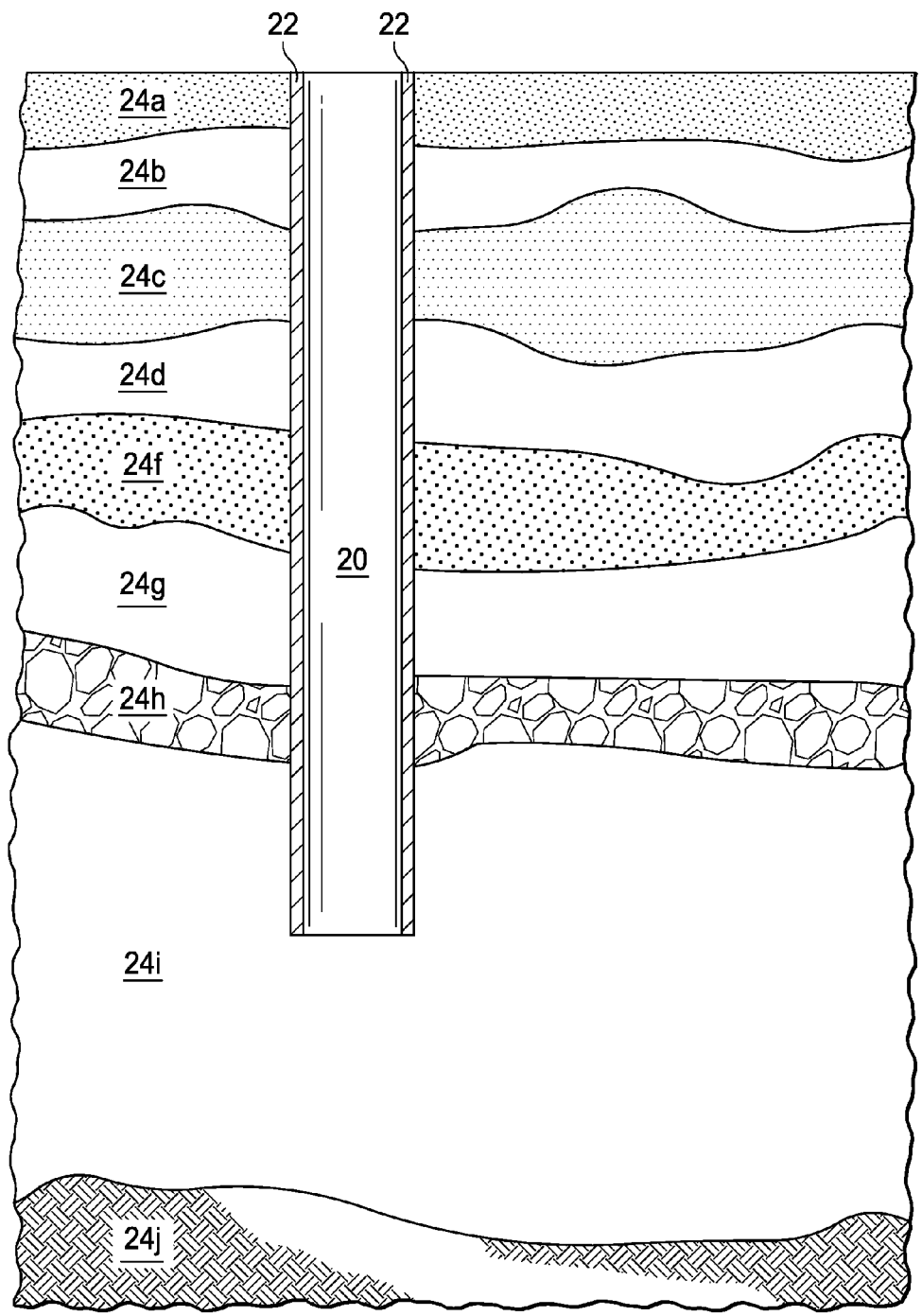
FIG. 4 is a diagram of the geometric layout of a vertical or deviated well in which layers of the earth having varying electrical and mechanical properties are depicted.

The electromagnetic methods described herein involve electrically energizing the earth at or near a fracture at depth and measuring the electric and magnetic responses at the earth's surface or in adjacent wells/boreholes. The electromagnetic methods described herein are typically used in connection with a cased wellbore, such as well 20 shown in FIG. 4. Specifically, casing 22 extends within well 20 and well 20 extends through geological strata 24a-24i in a manner that has three dimensional components.

Figure 5:
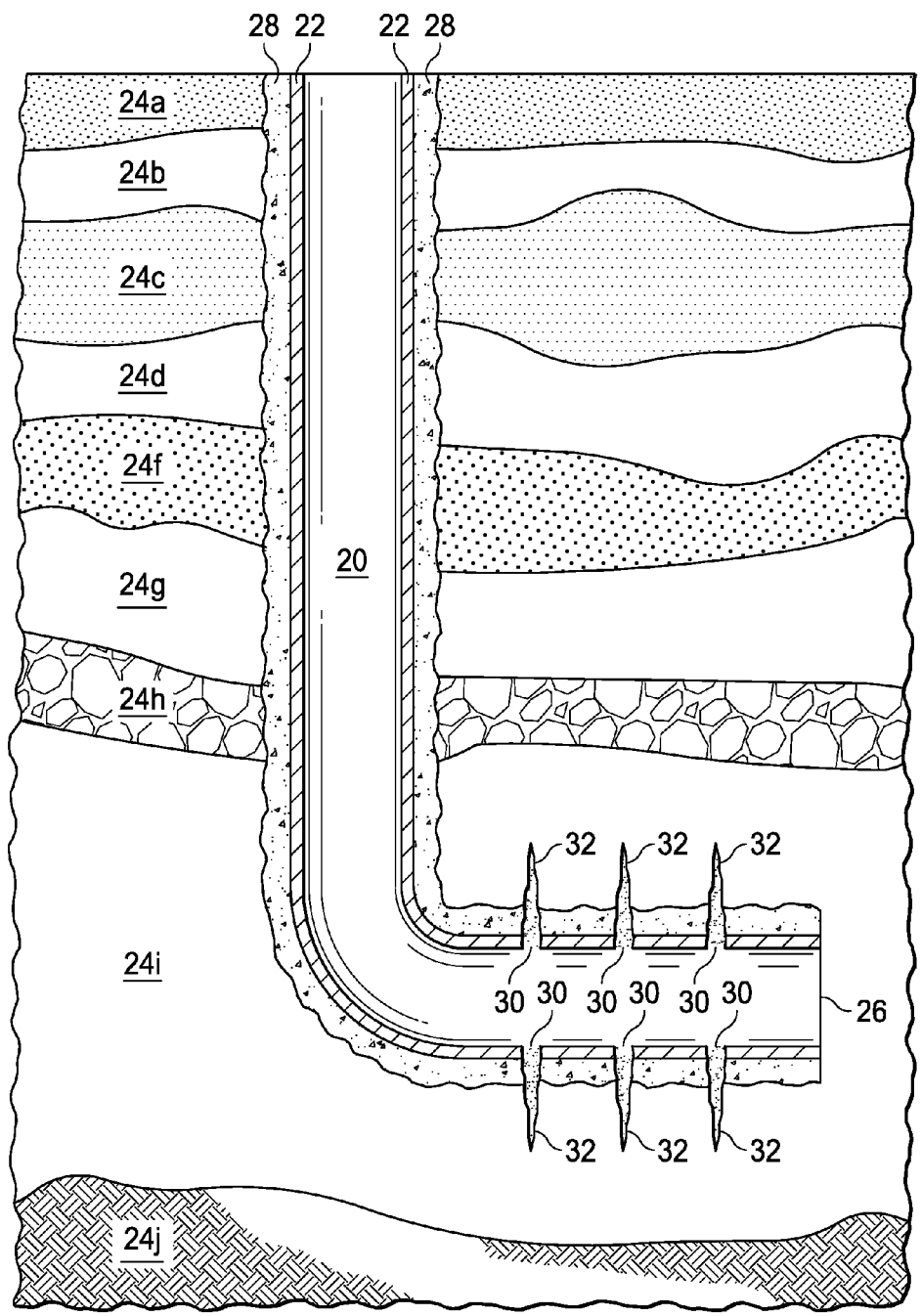
FIG. 5 is a schematic of an installed horizontal wellbore casing string traversing a hydrocarbon bearing zone with proppant filled fractures in which layers of the earth having varying electrical and mechanical properties are depicted.

Referring now to FIG. 5, a partial cutaway view is shown with production well 20 extending vertically downward through one or more geological layers 24a-24i and horizontally in layer 24i. While wells are conventionally vertical, the electromagnetic methods described herein are not limited to use with vertical wells. Thus, the terms "vertical" and "horizontal" are used in a general sense in their reference to wells of various orientations.

The preparation of production well 20 for hydraulic fracturing typically comprises drilling a bore 26 to a desired depth and then in some cases extending the bore 26 horizontally so that the bore 26 has any desired degree of vertical and horizontal components. Casing 22 is cemented 28 into well 20 to seal the bore 26 from the geological layers 24a-24i in FIG. 5. The casing 22 has a plurality of perforations 30. The perforations 30 are shown in FIG. 5 as being located in a horizontal portion of well 20 but those of ordinary skill in the art will recognize that the perforations can be located at any desired depth or horizontal distance along the bore 26, but are typically at the location of a hydrocarbon bearing zone in the geological layers 24, which may be within one or more of the geological layers 24a-24j. The hydrocarbon bearing zone may contain oil and/or gas, as well as other fluids and materials that have fluid-like properties. The hydrocarbon bearing zone in geological layers 24a-24j is hydraulically fractured by pumping a fluid into casing 22 and through perforations 30 at sufficient rates and pressures to create fractures 32 and then incorporating into the fluid an electrically-conductive proppant which will prop open the created fractures 32 when the hydraulic pressure used to create the fractures 32 is released.

The hydraulic fractures 32 shown in FIG. 5 are oriented radially away from the metallic well casing 22. This orientation is exemplary in nature. In practice, hydraulically-induced fractures 32 may be oriented radially as in FIG. 5, laterally or intermediate between the two. Various orientations are exemplary and not intended to restrict or limit the electromagnetic methods described herein in any way.

According to certain embodiments of the electromagnetic method of the present invention and as shown schematically in FIG. 6, electric current is carried down wellbore 20 to an energizing point which will generally be located within 10 meters or more (above or below) of perforations 30 in casing 22 via a seven strand wire line insulated cable 34, such as those which are well known to those of ordinary skill in the art and are widely commercially available from Camesa Wire, Rochester Wire and Cable, Inc., WireLine Works, Novametal Group, and Quality Wireline & Cable Inc. A sinker bar 36 connected to the wire line cable 34 contacts or is in close proximity to the well casing 22 whereupon the well casing 22 becomes a current line source that produces subsurface electric and magnetic fields. These fields interact with the fracture 32 containing electrically-conductive proppant to produce secondary electric and magnetic fields that will be used to detect, locate, and characterize the proppant-filled fracture 32.

Figure 6:
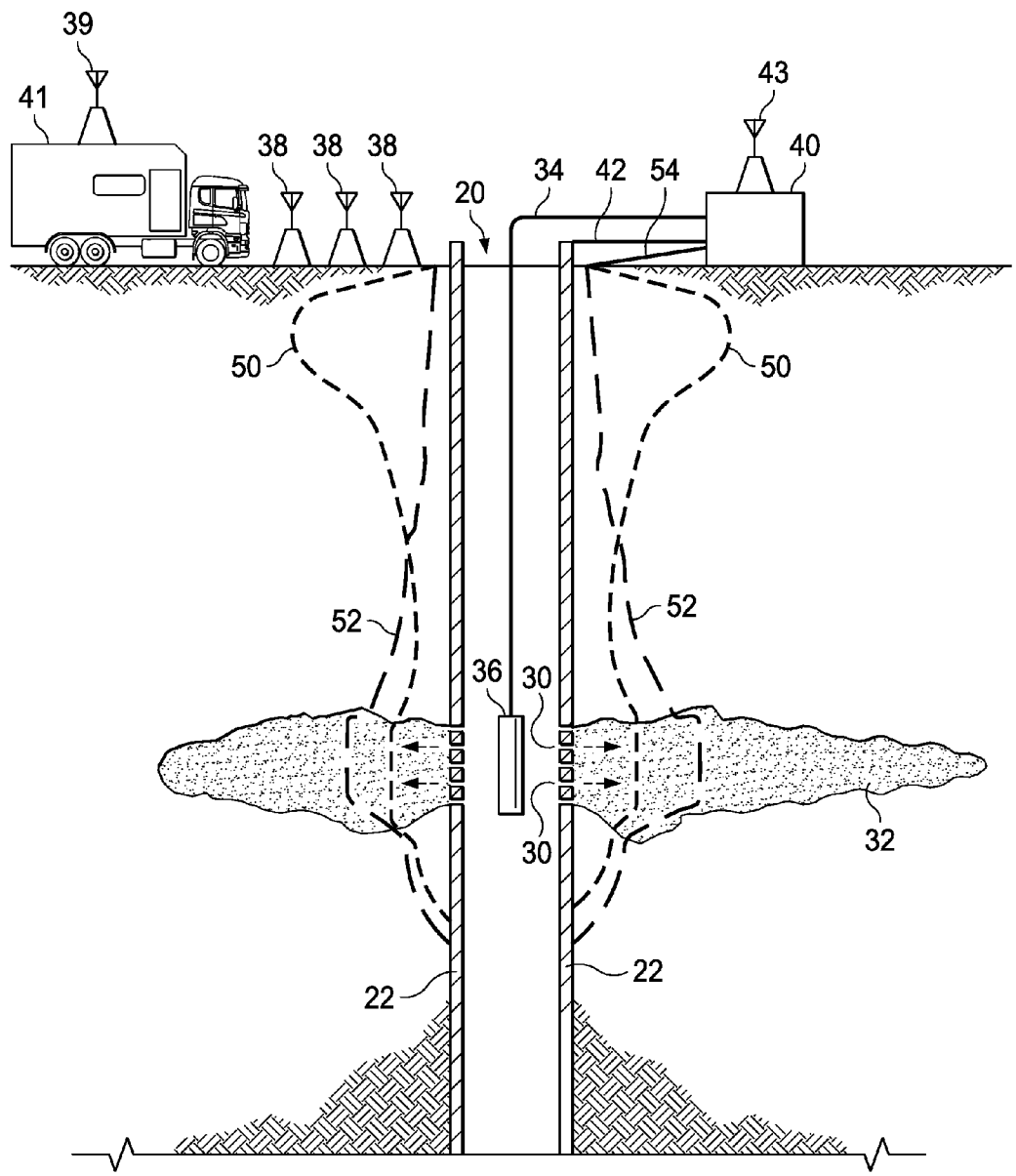
FIG. 6 is a schematic cross-sectional illustration of a hydraulic fracture mapping system which depicts two embodiments for introducing electric current into a wellbore, namely energizing the wellbore at the surface and energizing via a wireline with a sinker bar near perforations in the wellbore.

According to certain embodiments of the electromagnetic method of the present invention and as shown schematically in FIG. 6, a power control box 40 is connected to casing 22 by a cable 42 so that electric current is injected into the fracture well 20 by directly energizing the casing 22 at the well head. In one embodiment, the power control box 40 is connected wirelessly by a receiver/transmitter 43 to a receiver/transmitter 39 on equipment truck 41. Those of ordinary skill in the art will recognize that other suitable means of carrying the current to the energizing point may also be employed.

Figure 7:
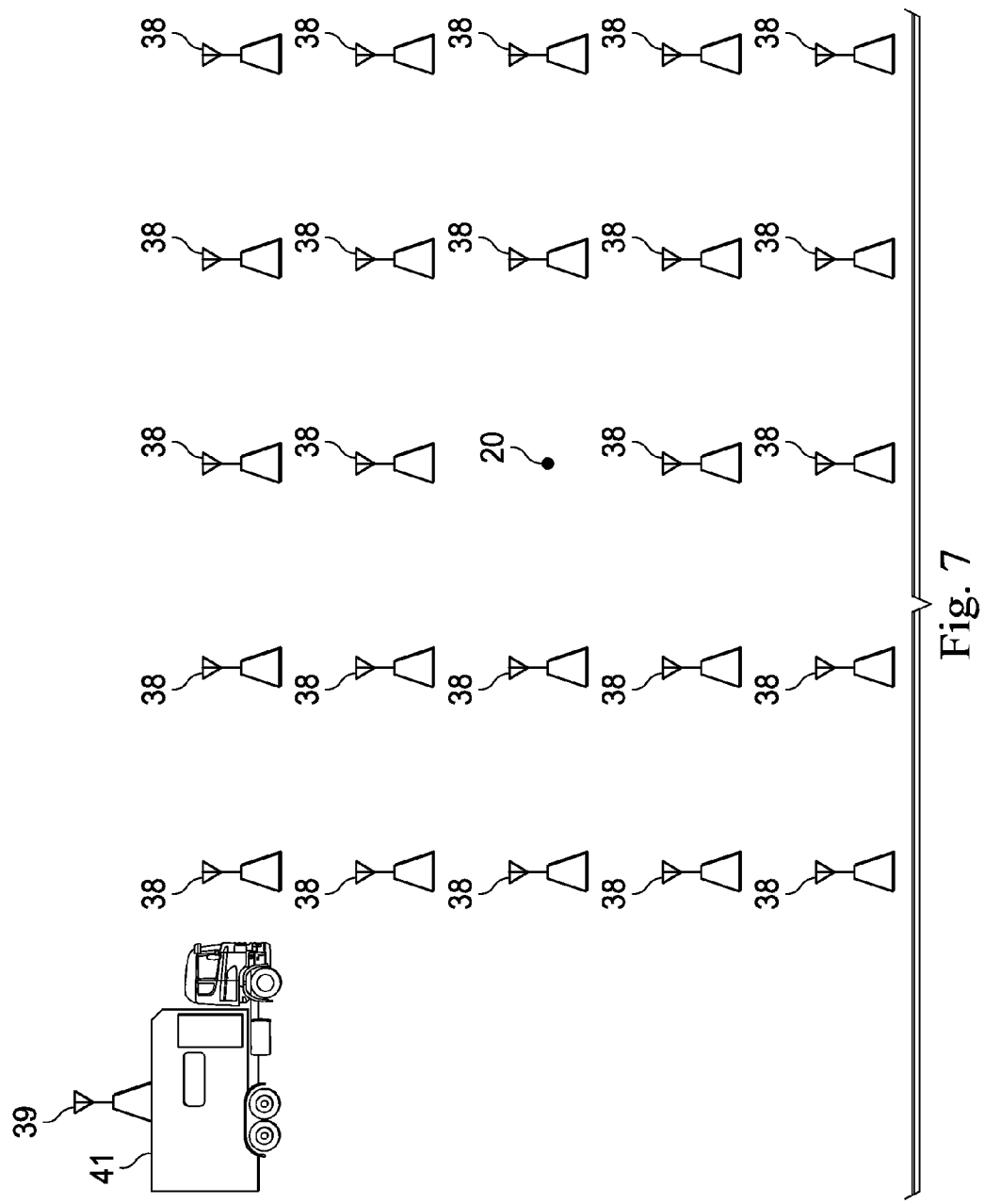
FIG. 7 is a schematic plan illustration of a hydraulic fracture mapping system.

As shown schematically in FIGS. 6-8, a plurality of electric and magnetic field sensors 38 will be located on the earth's surface in a rectangular or other suitable array covering the area around the fracture well 20 and above the anticipated fracture 32. In one embodiment, the sensors 38 are connected wirelessly to a receiver/transmitter 39 on equipment truck 41. The maximum dimension of the array (aperture) in general should be at least 80 percent of the depth to the fracture zone. The sensors 38 will measure the x, y and z component responses of the electric and magnetic fields. It is these responses that will be used to infer location and characterization of the electrically-conductive proppant through comparison to numerical simulations and/or inversion of the measured data to determine the source of the responses. The responses of the electric and magnetic field components will depend upon: the orientation of the fracture well 20, the orientation of the fracture 32, the electrical conductivity, magnetic permeability, and electric permittivity of layers 24a-24j, the electrical conductivity, magnetic permeability, and electric permittivity of the proppant filled fracture 32, and the volume of the proppant filled fracture 32. Moreover, the electrical conductivity, magnetic permeability and electric permittivity of the geological layers residing between the surface and the target formation layers 24a-24j influence the recorded responses. From the field-recorded responses, details of the proppant filled fracture 32 can be determined.

In another embodiment, electric and magnetic sensors can be located in adjacent well/boreholes.

Figure 9A:
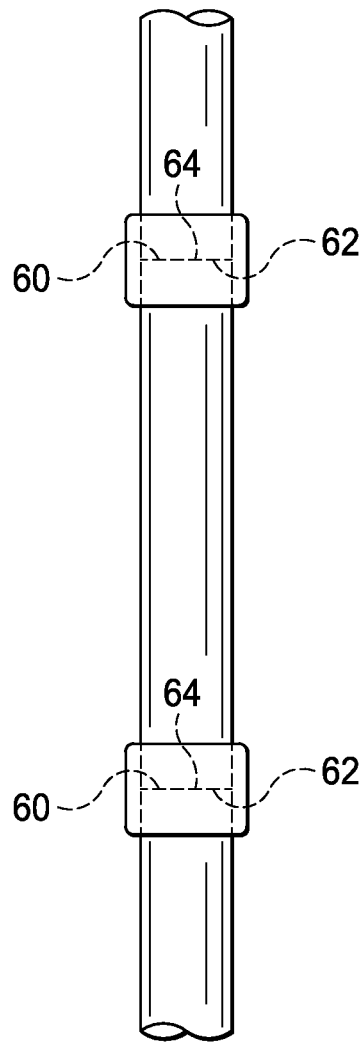
FIG. 9A is a schematic illustration of an electrically insulated casing joint.
Figure 9B:
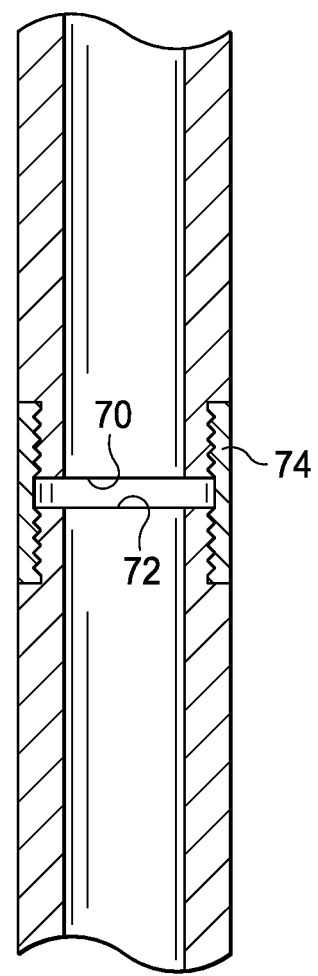
FIG. 9B is a schematic illustration of an electrically insulated casing collar.

Depending upon the conductivity of the earth surrounding the well casing 22, the current may or may not be uniform as the current flows back to the surface along the well casing 22. According to both embodiments shown in FIG. 6, current leakage occurs along wellbore 20 such as along path 50 or 52 and returns to the electrical ground 54 which is established at the well head. As described in U.S. patent application Ser. No. 13/206,041 filed Aug. 9, 2011 and entitled "Simulating Current Flow Through a Well Casing and an Induced Fracture," the entire disclosure of which is incorporated herein by reference, the well casing is represented as a leaky transmission line in data analysis and numerical modeling. Numerical simulations have shown that for a conducting earth (conductivity greater than approximately 0.05 siemens per meter (S/m)), the current will leak out into the formation, while if the conductivity is less than approximately 0.05 S/m the current will be more-or-less uniform along the well casing 22. As shown in FIGS. 9A and 9B, to localize the current in the well casing 22, electrically insulating pipe joints or pipe collars may be installed. According to the embodiment shown in FIG. 9A, an insulating joint can be installed by coating the mating surfaces 60 and 62 of the joint with a material 64 having a high dielectric strength, such as any one of the well-known and commercially available plastic or resin materials which have a high dielectric strength and which are of a tough and flexible character adapted to adhere to the joint surfaces so as to remain in place between the joint surfaces. As described in U.S. Pat. No. 2,940,787, the entire disclosure of which is incorporated herein by reference, such plastic or resin materials include epoxies, phenolics, rubber compositions, and alkyds, and various combinations thereof. Additional materials include polyetherimide and modified polyphenylene oxide. According to the embodiment shown in FIG. 9B, the mating ends 70 and 72 of the joint are engaged with an electrically-insulated casing collar 74. The transmission line representation is able to handle various well casing scenarios, such as vertical only, slant wells, vertical and horizontal sections of casing, and, single or multiple insulating gaps.

The detection, location, and characterization of the electrically-conductive proppant in a fracture will depend upon several factors, including but not limited to the net electrical conductivity of the fracture, fracture volume, the electrical conductivity, magnetic permeability, and electric permittivity of the earth surrounding the fracture and between the fracture and surface mounted sensors. The net electrical conductivity of the fracture means the combination of the electrical conductivity of the fracture, the proppant and the fluids when all are placed in the earth minus the electrical conductivity of the earth formation when the fracture, proppant and fluids were not present. Also, the total electrical conductivity of the proppant filled fracture is the combination of the electrical conductivity created by making a fracture, plus the electrical conductivity of the new/modified proppant plus the electrical conductivity of the fluids, plus the electro-kinetic effects of moving fluids through a porous body such as a proppant pack. The volume of an overly simplified fracture with the geometric form of a plane can be determined by multiplying the height, length, and width (i.e. gap) of the fracture. A three dimensional (3D) finite-difference electromagnetic algorithm that solves Maxwell's equations of electromagnetism can be used for numerical simulations. In order for the electromagnetic response of a proppant-filled fracture at depth to be detectable at the Earth's surface, the net fracture conductivity multiplied by the fracture volume within one computational cell of the finite difference (FD) grid must be larger than approximately 100 $Sm^2$ for a Barnett shale-like model where the total fracture volume is approximately 38 $m^3$. For the Barnett shale model, the depth of the fracture is 2000 m. These requirements for the numerical simulations can be translated to properties in a field application for formations other than the Barnett shale.

The propagation and/or diffusion of electromagnetic (EM) wavefields through three-dimensional (3D) geological media are governed by Maxwell's equations of electromagnetism.

According to one embodiment of the present invention, the measured three dimensional components of the electric and magnetic field responses can be analyzed with imaging methods such as an inversion algorithm based on Maxwell's equations and electromagnetic migration and/or holography to determine proppant pack location. Inversion of acquired data to determine proppant pack location involves adjusting the earth model parameters, including but not limited to the proppant location within a fracture or fractures and the net electrical conductivity of the fracture, to obtain the best fit to forward model calculations of responses for an assumed earth model. As described in Bartel, L. C., Integral wave-migration method applied to electromagnetic data, Sandia National Laboratories, 1994, the electromagnetic integral wave migration method utilizes Gauss's theorem where the data obtained over an aperture is projected into the subsurface to form an image of the proppant pack. Also, as described in Bartel, L. C., Application of EM Holographic Methods to Borehole Vertical Electric Source Data to Map a Fuel Oil Spill, Sandia National Laboratories, 1993, the electromagnetic holographic method is based on the seismic holographic method and relies on constructive and destructive interferences where the data and the source wave form are projected into an earth volume to form an image of the proppant pack. Due to the long wavelengths of the low frequency electromagnetic responses for the migration and holographic methods, it may be necessary to transform the data into another domain where the wavelengths are shorter. As described in Lee, K. H., et al., A new approach to modeling the electromagnetic response of conductive media, Geophysics, Vol. 54, No. 9 (1989), this domain is referred to as the q-domain. Further, as described in Lee, K. H., et al., Tomographic Imaging of Electrical Conductivity Using Low-Frequency Electromagnetic Fields, Lawrence Berkeley Lab, 1992, the wavelength changes when the transformation is applied.

Also, combining Maxwell's equations of electromagnetism with constitutive relations appropriate for time-independent isotropic media yields a system of six coupled first-order partial differential equations referred to as the "EH" system. The name derives from the dependent variables contained therein, namely the electric vector E and the magnetic vector H. Coefficients in the EH system are the three material properties, namely electrical current conductivity, magnetic permeability, and electric permittivity. All of these parameters can vary with 3D spatial position. The inhomogeneous terms in the EH system represent various body sources of electromagnetic waves, and include conduction current sources, magnetic induction sources, and displacement current sources. Conduction current sources, representing current flow in wires, cables, and borehole casings, are the most commonly-used sources in field electromagnetic data acquisition experiments.

An explicit, time-domain, finite-difference (FD) numerical method is used to solve the EH system for the three components of the electric vector E and the three components of the magnetic vector H, as functions of position and time. A three-dimensional gridded representation of the electromagnetic medium parameters, referred to as the "earth model" is required, and can be constructed from available geophysical logs and geological information. A magnitude, direction, and waveform for the current source are also input to the algorithm. The waveform can have a pulse-like shape (as in a Gaussian pulse), or can be a repeating square wave containing both positive and negative polarity portions, but is not limited to these two particular options. Execution of the numerical algorithm generates electromagnetic responses in the form of time series recorded at receiver locations distributed on, or within, the gridded earth model. These responses represent the three components of the E or H vector, or their time-derivatives.

Repeated execution of the finite-difference numerical algorithm enables a quantitative estimate of the magnitude and frequency-content of electromagnetic responses (measured on the earth's surface or in nearby boreholes) to be made as important modeling parameters are varied. For example, the depth of current source can be changed from shallow to deep. The current source can be localized at a point, or can be a spatially-extended transmission line, as with an electrically charged borehole casing. The source waveform can be broad-band or narrow-band in spectral content. Finally, changes to the electromagnetic earth model can be made, perhaps to assess the shielding effect of shallow conductive layers. The goal of such a modeling campaign is to assess the sensitivity of recorded electromagnetic data to variations in pertinent parameters. In turn, this information is used to design optimal field data acquisition geometries that have enhanced potential for imaging a proppant-filled fracture at depth.

The electric and magnetic responses are scalable with the input current magnitude. In order to obtain responses above the background electromagnetic noise, a large current on the order of 10 to 100 amps may be required. The impedance of the electric cable to the current contact point and the earth contact resistance will determine the voltage that is required to obtain a desired current. The contact resistance is expected to be small and will not dominate the required voltage. In addition, it may be necessary to sum many repetitions of the measured data to obtain a measurable signal level over the noise level. In the field application and modeling scenarios, a time-domain current source waveform can be used. A typical time-domain waveform consists of an on time of positive current followed by an off time followed by an on time of negative current. In other words, + current, then off, then − current, then off again. The repetition rate to be used would be determined by how long the current has to be on until a steady-state is reached or alternatively how long the energizing current has to be off until the fields have died to nearly zero. In this exemplary method, the measured responses would be analyzed using both the steady-state values and the decaying fields following the current shut-off. The advantage of analyzing the data when the energizing current is zero (decaying fields) is that the primary field contribution (response from the transmitting conductor; i.e., the well casing) has been eliminated and only the earth responses are measured. In addition, the off period of the time domain input signal permits analysis of the direct current electrical fields that can arise from electro-kinetic effects, including but not limited to, flowing fluids and proppant during the fracturing process. Fracture properties (orientation, length, volume, height and asymmetry will be determined through inversion of the measured data and/or a form of holographic reconstruction of that portion of the earth (fracture) that yielded the measured electrical responses or secondary fields. According to certain embodiments, a pre-fracture survey will be prepared to isolate the secondary fields due to the fracture. Those of ordinary skill in the art will recognize that other techniques for analyzing the recorded electromagnetic data, such as use of a pulse-like current source waveform and full waveform inversion of observed electromagnetic data can also be used.

A field data acquisition experiment was conducted to test the transmission line representation of a well casing current source. The calculated electric field and the measured electric field are in good agreement. This test demonstrates that the transmission line current source implementation in the 3D finite-difference electromagnetic code gives accurate results. The agreement, of course, depends upon an accurate model describing the electromagnetic properties of the earth. In this field data acquisition experiment, common electrical logs were used to characterize the electrical properties of the earth surrounding the test well bore and to construct the earth model.

The following examples are included to demonstrate illustrative embodiments of the present invention. It will be appreciated by those of ordinary skill in the art that the techniques disclosed in these examples are merely illustrative and are not limiting. Indeed, those of ordinary skill in the art should, in light of the present disclosure, appreciate that many changes can be made in the specific embodiments that are disclosed, and still obtain a like or similar result without departing from the spirit and scope of the invention.

EXAMPLE 1

Conventional low density and medium density ceramic proppants which are commercially available from CARBO Ceramics Inc. of Houston, Tex. under the trade names CARBOLITE® (CL) 20/40, CARBOHYDROPROP® (HP or HYDROPROP) 40/80, CARBOPROP® 20/40 and CARBOPROP 40/70 were coated with thin layers of metals using RF magnetron sputtering. Three metal targets were used for the depositions, namely aluminum, copper and nickel. The depositions were performed in a sputter chamber using a 200 W RF power, a deposition pressure of 5 mTorr, and an argon background flow rate of 90 sccm. The sputter chamber had three articulating 2 inch target holders that can be used to coat complex shapes. The system also had a rotating, water-cooled sample stage that was used in a sputter-down configuration. Prior to coating the proppants, deposition rates for the three metals were determined by sputtering the metals onto silicon wafers and measuring the coating thickness by scanning electron microscope (SEM) cross-sectional analysis with a Zeiss Neon 40 SEM.

The proppants were loaded into the sputter chamber in a 12 inch diameter aluminum pan with 1 inch tall sides. Approximately 130 g of proppant was used for each coating run. This amount of proppant provided roughly a single layer of proppant on the base of the pan. The proppant was "stirred" during the deposition using a 6 inch long fine wire metal that was suspended above the pan and placed into contact with the proppant in the pan. The coating deposition times were doubled compared to what was determined from the silicon wafer coating thickness measurements to account for roughly coating the proppants on one side, rolling them over, and then coating the other side. Coatings of approximately 100 nm and approximately 500 nm were deposited on each type of proppant with each of the three metals.

Following the coating process, the proppant was inspected visually and by optical microscopy. The results indicated that the proppant having a thinner coating of approximately 100 nm had a generally non-uniform coating while the proppant with the thicker coating of approximately 500 nm had a uniform coating.

EXAMPLE 2

Conventional low density and medium density ceramic proppants which are commercially available from CARBO Ceramics Inc. of Houston, Tex. under the trade names CARBOLITE 20/40, CARBOHYDROPROP 40/80, CARBOPROP 20/40 and CARBOPROP 40/70 were sensitized and activated by immersing in a 2.0% stannous chloride solution for about 3 minutes, rinsing in water, immersing in a 0.01% palladium chloride solution for about 3 minutes and finally thoroughly rinsing in water.

An electroless nickel plating bath solution was prepared that included 25 g of nickel sulphate hexahydrate, 20 g. of sodium hypophosphate, 11 g. of sodium citrate dihydrate and 10 g. of sodium acetate per liter of distilled water. The pH of the plating bath was adjusted to 5 using sulfuric acid and the plating bath was then heated to a temperature of 90° C. The previously sensitized and activated proppant samples were then added to the bath and coated for 1-30 minutes to yield an electrically-conductive nickel coated proppant. Following the coating process, the coated proppant samples were inspected visually and by optical microscopy.

EXAMPLE 3

Conventional low density and medium density ceramic proppants which are commercially available from CARBO Ceramics, Inc. of Houston, Tex. under the trade names CARBOLITE 20/40, CARBOHYDROPROP 40/80, CARBOPROP 20/40 and CARBOPROP 40/70 were sensitized and activated by immersing in a 2.0% stannous chloride solution for about 3 minutes, rinsing in water, immersing in a 0.01% palladium chloride solution for about 3 minutes and finally thoroughly rinsing in water.

An electroless copper plating bath solution was prepared that included 53 g of potassium sodium tartrate, 19 g of copper sulfate, 13 g of sodium hydroxide and 21 g of sodium carbonate per liter of distilled water. The plating bath was then prepared by adding 10-40 ml of formaldehyde per liter of the concentrate. The plating bath was then heated to 45° C. The previously sensitized and activated proppants were then added to the bath and coated for 1-30 minutes to yield an electrically-conductive copper-coated proppant. Following the coating process, the coated proppant samples were inspected visually and by optical microscopy.

EXAMPLE 4

In this example, 57 grams of CARBOLITE 20/40 was immersed in 20 ml of deionized water containing 10 mg of sodium borohydride and 1 µL of Tween™ 20 (PEG(20) sorbitan monolaurate). This mixture was then evaporated onto the surface of the particles by drying in an 85° C. oven. These dried particles were then transferred to a bath formed from the Caswell Electroless Nickel Plating Kit, which is commercially available from Caswell Inc. of Lyons, N.Y., where plating initiated instantaneously. This example demonstrates that the surface of the ceramic particles can be activated without the use palladium or other precious metals. It was found that the surface of the particles can be activated by soaking the particles in a reducing agent solution, such as sodium borohydride or sodium cyanoborohydride, where this solution can either be dried onto the particles or the particles moistened with this solution can be transferred to an electroless plating bath, both of which are sufficient to induce plating.

EXAMPLE 5

It was found that certain ceramic mixtures used to make proppants contain a significant amount of oxidized iron, or iron moieties. These iron moieties can be reduced to elemental iron, which is catalytically active to copper and nickel electroless plating solutions. In this example, 57 grams of CARBOPROP 20/40 was placed into an alumina boat that was inserted into a tube furnace under an atmosphere of 5% hydrogen in argon. The temperature was raised to 700° C. over a period of two hours and the CARBOPROP 20/40 was permitted to soak for two hours. The furnace was permitted to cool naturally and the sample was in a condition to be plated after removal from the furnace.

This example shows that by utilizing native iron content, proppant particles can be plated without the need for additional activators, such as Pd. The reduction of surface iron ions to atomic iron can be induced near the end of a manufacturing process by maintaining a reducing environment in a kiln, which can be characterized by the presence of carbon monoxide or other products of partial combustion. The iron on the surface of the proppant particles can also be reduced after manufacturing by exposure to carbon monoxide or hydrogen at elevated temperatures, which can be from about 300° C. to about 1100° C. Finally, the iron on the surface of the particles can be reduced by placing the particles in a solution of a reducing agent, such as sodium borohydride. After reduction of these surface iron sites, the particles can be plated using electroless plating solutions.

When used as a proppant, the particles described herein can be handled in the same manner as conventional proppants. For example, the particles can be delivered to the well site in bags or in bulk form along with the other materials used in fracturing treatment. Conventional equipment and techniques can be used to place the particles in the formation as a proppant. For example, the particles are mixed with a fracture fluid, which is then injected into a fracture in the formation.

EXAMPLE 6

Conventional low density ceramic proppants which are commercially available from CARBO Ceramics Inc. of Houston, Tex. under the trade names of CARBOLITE 20/40 and CARBOHYDROPROP 40/80 were coated with thin layers of a conductive polymer using a planetary bench mixer with a "B" flat beater and a heating mantle. Approximately 500 g of proppant was used for each coating run. Coatings of 0.1% by weight and 0.4% by weight of the proppant were prepared as shown in Table I below:

TABLE I

| Conductive polymer | 0.1% coating | 0.4% coating |
| --- | --- | --- |
| PEDOT:PSS Obtained from Sigma-Aldrich as a 1.2% solution in water | 42 g | 167 g |
| PANI Obtained from Sigma-Aldrich in an emeraldine base, as a 5% solution in tetrahydrofuran (THF) and doped with a 4-dodecylbenzene sulfonic acid in a 1:1 molar ratio | 10 g | 40 g |
| PPY Obtained from Sigma-Aldrich as a doped 5% dispersion in water | 10 g | 40 g |

In each case, the proppant was heated to a temperature of 150-200° C. in an oven and was added to a steel mixing bowl. An adhesion promoter, such as aminopropyl triethoxy silane, an amino-functional coupling agent, and glycidyloxypropyl trimethoxy silane, a functional organosilane coupling agent, was added to the heated proppant to enhance the bond between the inorganic substrate and the organic polymer. The mixing bowl was set in an external heating mantle to allow the heat to remain in the system as additives were added. The "B" flat beater traveled along the side of the wall surfaces of the mixing bowl in circular orbits at an intermediate speed of approximately 280 rpm while the mixing bowl stayed in place, thereby allowing complete mixing in a short time. A typical batch schedule is shown in Table II below:

TABLE II

Coating Schedule on Ceramics:

| Ingredient | Time of Addition |
| --- | --- |
| Substrate | 0 s |
| Adhesion Promoter | 7 s |
| Conductive Polymer | 15 s |
| End Cycle | 5-10 min |

Additionally, 0.1% and 0.4% coatings were made by adding PEDOT:PSS to a phenol-formaldehyde (Novolac) coating using a planetary mixer with "B" flat beater and a heating mantle as described above. Approximately 500 g of proppant was used for each coating run. For a 0.1% and 0.4% by weight coating of the proppant, approximately 42 g and 167 g of PEDOT:PSS, respectively, were added to 500 g of proppant with 20 g of phenol-formaldehyde (Novolac) resin cross-linked with hexamine (13% hexamine based on phenol-formaldehyde (Novolac) resin) with and without adhesion promoters as mentioned above. A typical batch schedule is shown in Table III below:

TABLE III

Coating Schedule on Ceramics with Phenol-Formaldehyde Resin:

| Ingredient | Time of Addition |
| --- | --- |
| Substrate | 0 s |
| Phenol-Formaldehyde resin | 0 s |
| Adhesion Promoter | 7 s |
| Hexamine (cross-linker) | 30 s |
| Conductive Polymer | 1.5-2 min |
| End Cycle | 5-10 min |

Following the coating process, the coated proppant samples were inspected visually and by optical microscopy.

EXAMPLE 7

Figure 10:
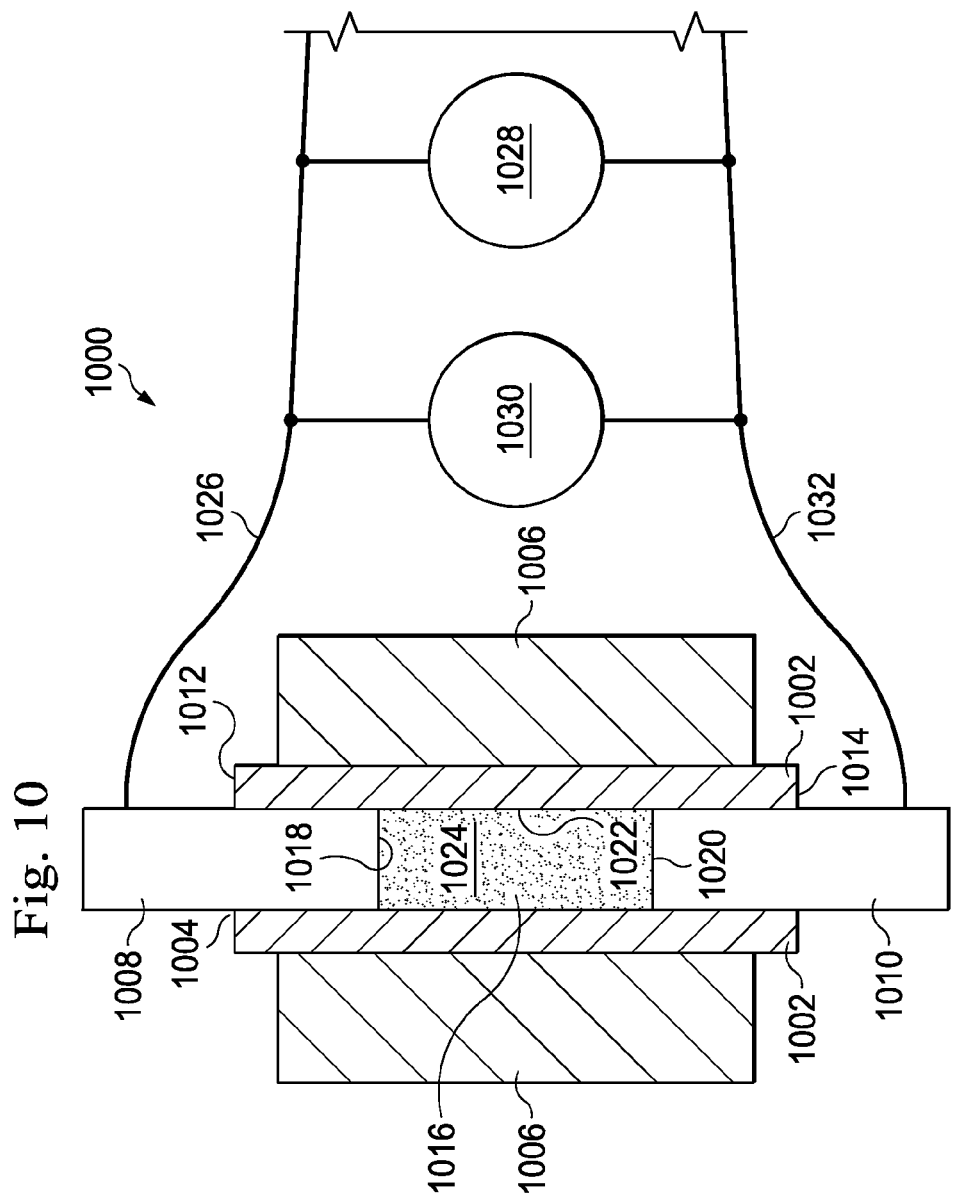
FIG. 10 is a schematic illustration of a test system for measuring proppant electrical resistance.

The electrical conductivity of various proppant samples prepared according to Examples 1-3 and 6 as well as uncoated proppant samples was measured using the test device shown in FIG. 10. As shown in FIG. 10, the test system 1000 included an insulating boron nitride die 1002, having an inside diameter of 0.5 inches and an outside diameter of 1.0 inches, disposed in a bore 1004 in a steel die 1006 in which the bore 1004 had an inside diameter of 1.0 inches. Upper and lower steel plungers 1008 and 1010 having an outside diameter of 0.5 inches were inserted in the upper and lower ends 1012, 1014, respectively, of the insulating boron nitride die 1002 such that a chamber 1016 is formed between the leading end 1018 of the upper plunger 1008, the leading end 1020 of the lower plunger 1010 and the inner wall 1022 of the boron nitride sleeve 1002. Upper plunger 1008 was removed from the insulating boron nitride die 1002 and proppant was loaded into the chamber 1016 until the proppant bed 1024 reached a height of about 1 to 2 cm above the leading end 1020 of the lower plunger 1010. The upper plunger 1008 was then reinstalled in the insulating boron nitride die 1002 until the leading end 1018 of the upper plunger 1008 engaged the proppant 1024. A copper wire 1026 was connected to the upper plunger 1008 and one pole of each of a current source 1028 and a voltmeter 1030. A second copper wire 1032 was connected to the lower plunger 1010 and the other pole of each of the current source 1028 and the voltmeter 1030. The current source can be any suitable DC current source well-known to those of ordinary skill in the art such as a Keithley 237 High Voltage Source Measurement Unit in the DC current source mode and the voltmeter can be any suitable voltmeter well known to those of ordinary skill in the art such as a Fluke 175 True RMS Multimeter which may be used in the DC mV mode for certain samples and in the ohmmeter mode for higher resistance samples.

The current source was powered on and the resistance of the test system 1000 with the proppant bed 1024 in the chamber 1016 was then determined. The resistance of the proppant 1024 was then measured with the Multimeter as a function of pressure using the upper plunger 1008 and lower plunger 1010 both as electrodes and to apply pressure to the proppant bed 1024. Specifically, R=V/I–the resistance of the system with the plungers touching is subtracted from the values measured with the proppant bed 1024 in the chamber 1016 and the resistivity, $\rho=R*A/t$ where A is the area occupied by the proppant bed 1024 and t is the thickness of the proppant bed 1024 between the upper plunger 1008 and the lower plunger 1010.

The results were as follows:

Electrical measurements of base proppants without the addition of any conductive material were conducted at 100 V DC on samples that were 50 volume % proppant in wax that were pressed into discs nominally 1 inch in diameter and approximately 2 mm thick. Using these values to calculate the resistivity and using the measured resistivity for pure wax, the values below were extrapolated by plotting log (resistivity) vs. volume fraction proppant and extrapolating to a volume fraction of one:

CARBOPROP 40/70: $2 \times 10^{12}$ Ohm-cm
CARBOPROP 20/40: $0.6 \times 10^{12}$ Ohm-cm
CARBOHYDROPROP: $1.8 \times 10^{12}$ Ohm-cm
CARBOECONOPROP: $9 \times 10^{12}$ Ohm-cm It should be noted that the resistivities of the samples measured above are very high and not suitable for detection in the present invention.

Electrical measurements of base proppants with coatings of aluminum in thicknesses of 100 nm and 500 nm prepared according to Example 1, and base proppants with coatings of 0.1% or 0.4% of poly(3,4-ethylenedioxythiophene) (PEDOT), with or without amino silane were conducted. The results are shown in Table IV below and FIG. 11.

Figure 11:
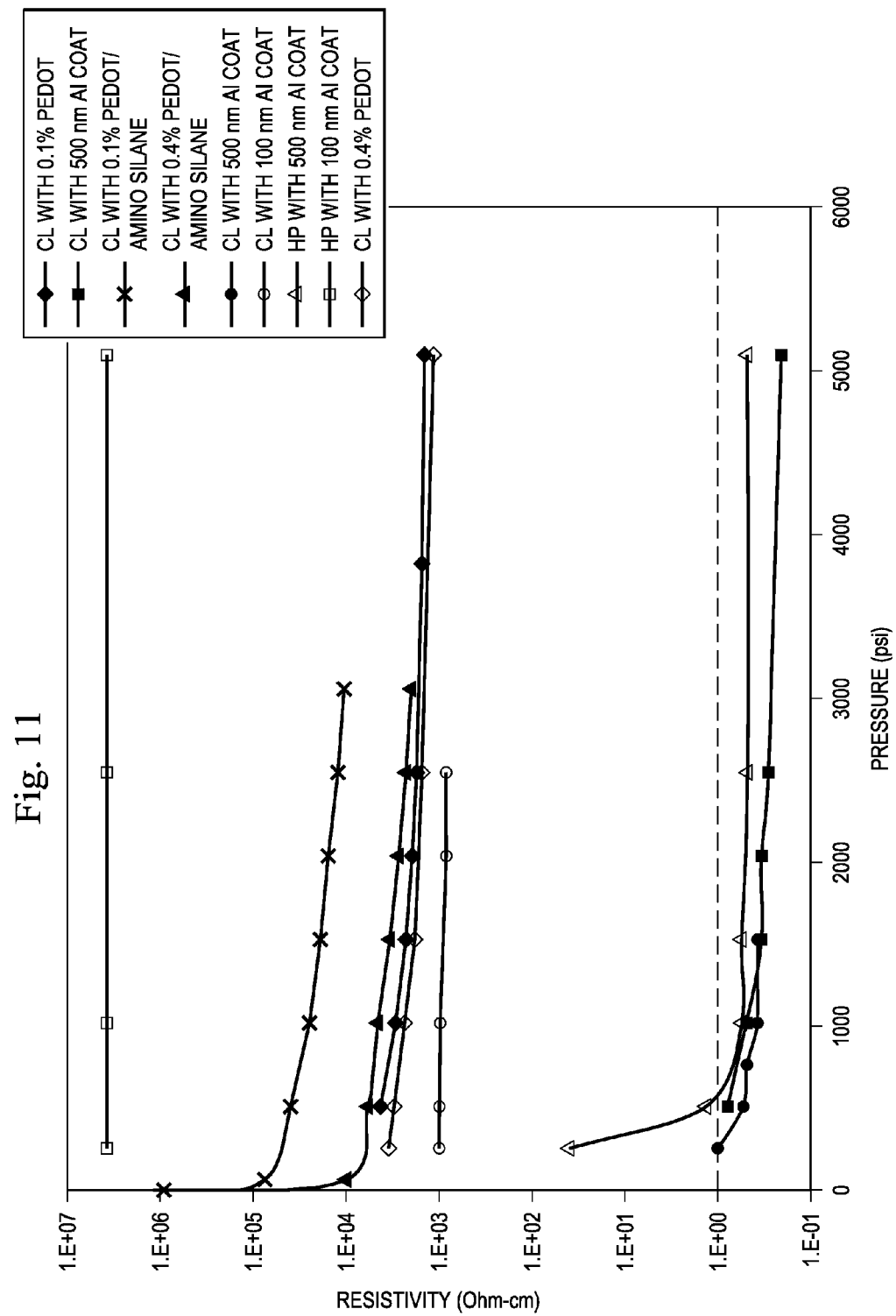
FIG. 11 is a graph of resistivity (Ohm-cm) vs. Closure Pressure (psi) for various proppant samples.

As can be seen from FIG. 11, the best results in terms of conductivity were obtained with CARBOLITE 20/40 and CARBOHYDROPROP 40/80 having a 500 nm thick coating of aluminum.

Electrical measurements of mixtures of base proppants with varying percentages of such base proppants with coatings of aluminum in thicknesses of 500 nm prepared according to Example 1 were conducted. The results are shown in Tables V and VI below and FIGS. 12-13.

Table V shows data for mixtures of CARBOLITE 20/40 with a 500 nm coating of aluminum and CARBOLITE 20/40 with no added conductive material. For each sample shown in Table V, 3 g. of the sample material was placed in the 0.5 inch die to provide an area of 0.196 square inches. The applied current for each test was 5 mA and the tests were conducted at room temperature.

TABLE V

| Load (lbs) | Pressure (psi) | Voltage (mV) | Resistance (Ohm) | Resistivity (Ohm-cm) |
|---|---|---|---|---|
| 80% 500 nm Al-coated CARBOLITE with 20% CARBOLITE 20/40 ||||||
| 100 | 509 | 6.1 | 1.22 | 1.107 |
| 200 | 1019 | 5.6 | 1.12 | 1.016 |
| 300 | 1528 | 5.0 | 1.00 | 0.907 |
| 400 | 2037 | 4.7 | 0.94 | 0.853 |
| 500 | 2546 | 4.5 | 0.90 | 0.817 |
| 60% 500 nm Al-coated CARBOLITE with 40% CARBOLITE 20/40 |||||
| 200 | 1019 | 20.0 | 4.00 | 3.630 |
| 300 | 1528 | 17.8 | 3.56 | 3.230 |
| 400 | 2037 | 17.0 | 3.40 | 3.085 |
| 500 | 2546 | 16.1 | 3.22 | 2.922 |
| 600 | 3056 | 15.8 | 3.16 | 2.867 |
| 40% 500 nm Al-coated CARBOLITE with 60% CARBOLITE 20/40 |||||
| 100 | 509 | 253 | 50.60 | 46.516 |
| 200 | 1019 | 223 | 44.60 | 41.000 |
| 300 | 1528 | 218 | 43.60 | 40.080 |
| 400 | 2037 | 226 | 45.20 | 41.552 |
| 500 | 2546 | 221 | 44.20 | 40.632 |

Table VI shows data for mixtures of HYDROPROP 40/80 with a 500 nm coating of aluminum and HYDROPROP 40/80 with no added conductive material. For each sample shown in Table VI, 3 g. of the sample material was placed

TABLE IV

| | Resistivity (ohm-cm) | | | | |
|---|---|---|---|---|---|
| Description | 0 psi | 1500 psi | 2500 psi | 3000 psi | 5000 psi |
| Base Material-no coating/no modification | $9 \times 10^{12}$ | Not measured | Not measured | Not measured | Not measured |
| CL w/0.1% PEDOT | Not measured | 1000 to 5000 | 1000 to 5000 | 1000 to 5000 | 1000 to 5000 |
| CL w/0.1% PEDOT/amino silane | Not measured | 10,000 to 100,000 | 10,000 to 50,000 | 10,000 to 25,000 | Not measured |
| CL w/0.4% PEDOT | Not measured | 1000 to 5000 | 1000 to 5000 | 1000 to 5000 | 1000 to 5000 |
| CL w/0.4% PEDOT/amino silane | Not measured | 5000 to 10,000 | 5000 | 5000 | Not measured |
| CL w/100 nm Al coat | Not measured | 1,000 | 1,000 | 1,000 | Not measured |
| CL w/500 nm Al coat | 5 to 10 | ~0 | 0.1-0 | 0.1-0 | 0.1-0 |
| CL w/500 nm Al coat | Not measured | ~0 | 0.27 | Not measured | Not measured |
| HP w/100 nm Al coat | Not measured | >1,000,000 | >1,000,000 | >1,000,000 | >1,000,000 |
| HP w/500 nm Al coat | Not measured | 0-1 | 0.30 | 0-1 | 0-1 | in the 0.5 inch die to provide an area of 0.196 square inches. The applied current for each test was 5 mA and the tests were conducted at room temperature.

TABLE VI

| Load (lbs) | Pressure (psi) | Voltage (mV) | Resistance (Ohm) | Resistivity (Ohm-cm) |
|---|---|---|---|---|
| 80% 500 nm Al-coated HYDROPROP 40/80 with 20% HYDROPROP 40/80 | | | | |
| 100 | 509 | 5.9 | 1.18 | 1.083 |
| 200 | 1019 | 5.3 | 1.06 | 0.973 |
| 300 | 1528 | 4.9 | 0.98 | 0.900 |
| 400 | 2037 | 4.6 | 0.92 | 0.845 |
| 500 | 2546 | 4.4 | 0.88 | 0.808 |
| 60% 500 nm Al-coated HYDROPROP 40/80 with 40% HYDROPROP 40/80 | | | | |
| 200 | 1019 | 17.5 | 3.50 | 3.167 |
| 300 | 1528 | 15.6 | 3.12 | 2.823 |
| 400 | 2037 | 14.5 | 2.90 | 2.624 |
| 500 | 2546 | 13.8 | 2.76 | 2.497 |
| 40% 500 nm Al-coated HYDROPROP 40/80 with 60% HYDROPROP 40/80 | | | | |
| 200 | 1019 | 550 | 110.00 | 99.532 |
| 300 | 1528 | 470 | 94.00 | 85.055 |
| 400 | 2037 | 406 | 81.20 | 73.473 |
| 500 | 2546 | 397 | 79.40 | 71.844 |

Figure 12:
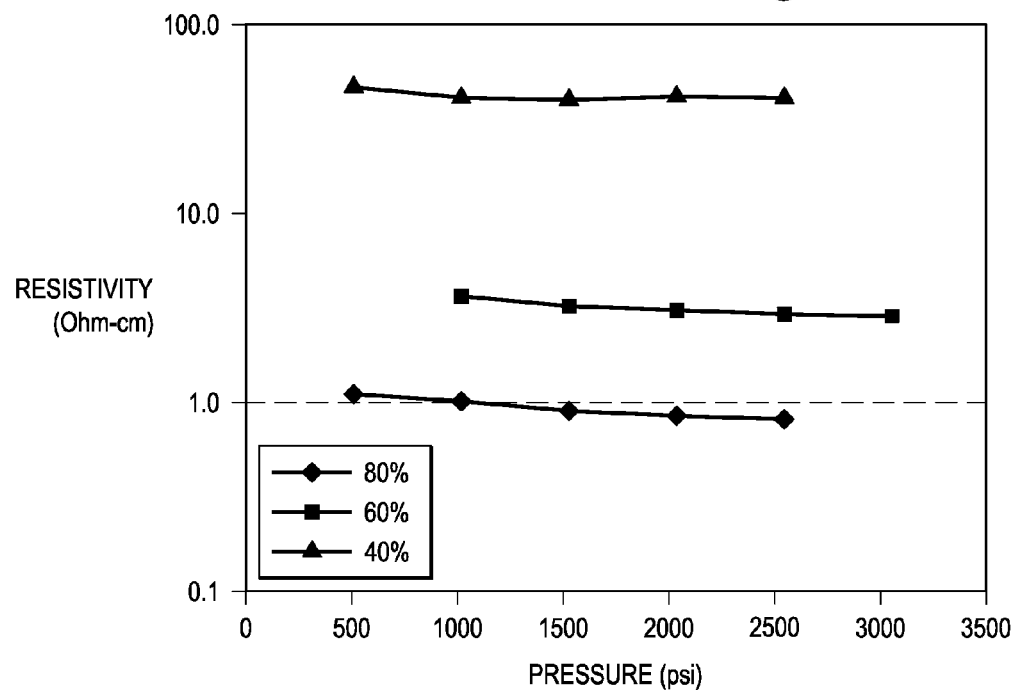
FIG. 12 is a graph of resistivity (Ohm-cm) vs. Closure Pressure (psi) for mixtures of CARBOLITE 20/40 coated with aluminum and standard ECONOPROP 20/40 samples.
Figure 13:
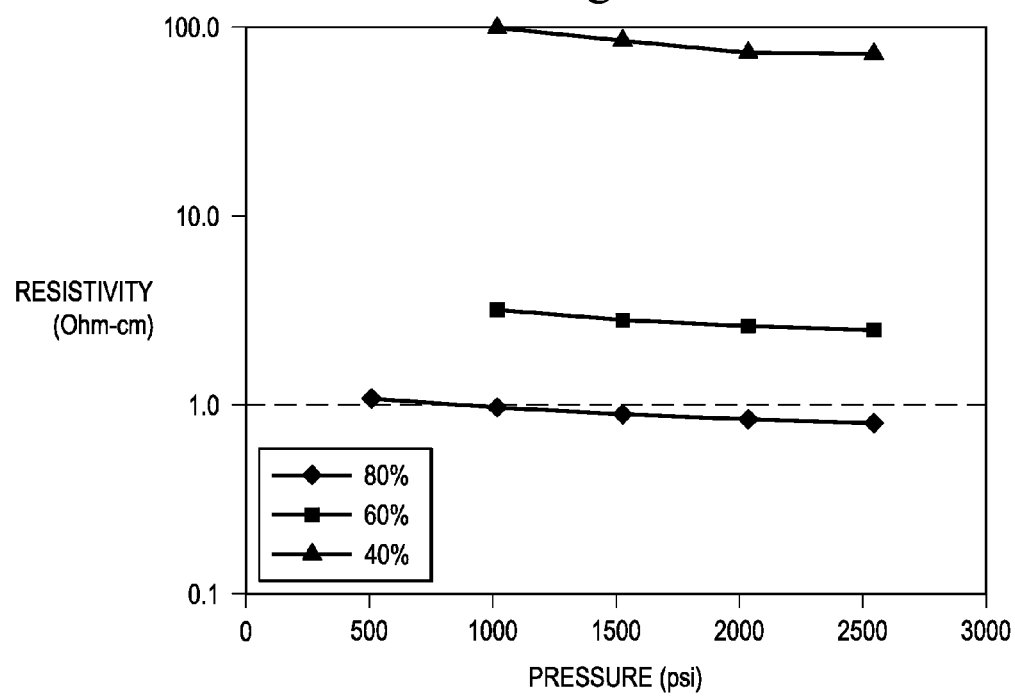
FIG. 13 is a graph of resistivity (Ohm-cm) vs. Closure Pressure (psi) for mixtures of HYDROPROP 40/80 coated with aluminum and standard HYDROPROP 40/80 samples.

As can be seen from TABLES V and VI as well as FIGS. 12-13, the resistivity of the proppant packs, regardless of the relative amounts of coated or un-coated proppant, tends to decrease with increasing closure pressure. In addition, as the relative amount of uncoated proppant increases and the relative amount of coated proppant decreases, the resistivity of the proppant packs increases dramatically. Lastly, the lowest resistivity is achieved with 100% Al-coated proppant. No mixture of coated and uncoated proppant results in a resistivity measurement less than 100% Al-coated proppant.

Electrical measurements of proppants with coatings of nickel and copper were also conducted. The results are shown in TABLE VII below and FIG. 14. TABLE VII shows data for CARBOLITE 20/40 with a coating of nickel and CARBOLITE 20/40 with a coating of copper. For each sample shown in TABLE VII, the sample material was placed in the 0.5 inch die. The applied voltage for each test was 0.005V.

TABLE VII

| Load (lbs) | Pressure (psi) | Current (mA) | Resistance (Ohm) | Conductivity (S/m) |
|---|---|---|---|---|
| Ni-coated CARBOLITE 20/40 | | | | |
| 100 | 509 | 5.9 | 0.85 | 766.04 |
| 200 | 1019 | 6.1 | 0.75 | 966.44 |
| 300 | 1528 | 7.4 | 0.68 | 1182.18 |
| 400 | 2037 | 7.8 | 0.64 | 1327.66 |
| 500 | 2546 | 8.1 | 0.62 | 1449.91 |
| 800 | 4074 | 8.6 | 0.58 | 1684.37 |
| 1000 | 5093 | 8.9 | 0.56 | 1847.51 |
| Cu-coated CARBOLITE 20/40 | | | | |
| 100 | 509 | 9.3 | 0.54 | 2098.05 |
| 200 | 1019 | 10.6 | 0.47 | 3330.51 |
| 300 | 1528 | 10.9 | 0.46 | 3766.11 |
| 400 | 2037 | 11.1 | 0.45 | 4108.19 |
| 500 | 2546 | 8.1 | 0.45 | 4298.15 |
| 800 | 4074 | 11.2 | 0.43 | 4962.66 |
| 1000 | 5093 | 11.5 | 0.43 | 5222.51 |

Figure 15:
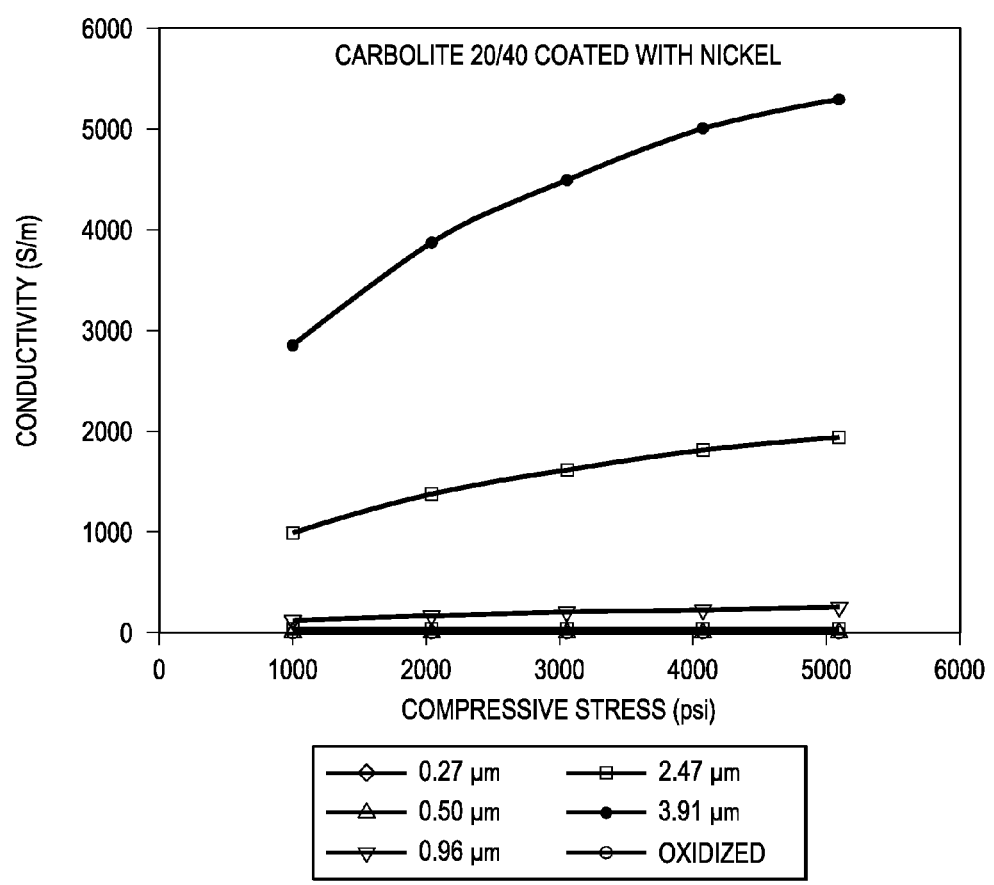
FIG. 15 is a graph of Conductivity (Siemens/m) vs. Pressure (psi) for CARBOLITE 20/40 samples coated with varied thicknesses of nickel.

Electrical measurements of proppants having coatings of varied thicknesses of nickel were also conducted. The results are shown in TABLE VIII below and FIG. 15. TABLE VIII shows data for CARBOLITE 20/40 with a coating of nickel at thicknesses of 0.27 microns, 0.50 microns, 0.96 microns, 2.47 microns, and 3.91 microns. One sample in FIG. 15 became oxidized and because of this was not sufficiently conductive for purposes of this example. For each sample shown in TABLE VIII, the sample material was placed in the 0.5 inch die. The applied voltage for each test was 0.01V.

TABLE VIII

| Load (lbs) | Pressure (psi) | Current (mA) | Resistance (Ohm) | Conductivity (S/m) |
|---|---|---|---|---|
| CARBOLITE 20/40 with 0.27 micron thick Ni-coating | | | | |
| 200 | 1019 | 1.0E−07 | 1.00E+08 | 3.738E−06 |
| 400 | 2037 | 0.004 | 2.56E+03 | 0.146 |
| 600 | 3056 | 0.021 | 4.76E+02 | 0.786 |
| 800 | 4074 | 0.040 | 2.50E+02 | 1.498 |
| 1000 | 5093 | 0.055 | 1.82E+02 | 2.060 |
| CARBOLITE 20/40 with 0.50 micron thick Ni-coating | | | | |
| 200 | 1019 | 0.06 | 1.82E+02 | 2.060 |
| 400 | 2037 | 0.23 | 4.35E+01 | 8.674 |
| 600 | 3056 | 0.39 | 2.56E+01 | 14.800 |
| 800 | 4074 | 0.52 | 1.92E+01 | 19.833 |
| 1000 | 5093 | 0.61 | 1.64E+01 | 23.347 |
| CARBOLITE 20/40 with 0.96 micron thick Ni-coating | | | | |
| 200 | 1019 | 2.8 | 3.57 | 117.198 |
| 400 | 2037 | 3.9 | 2.56 | 171.292 |
| 600 | 3056 | 4.5 | 2.22 | 203.110 |
| 800 | 4074 | 4.9 | 2.04 | 225.317 |
| 1000 | 5093 | 5.3 | 1.89 | 248.375 |
| CARBOLITE 20/40 with 2.47 micron thick Ni-coating | | | | |
| 200 | 1019 | 13.2 | 7.58E−01 | 994.508 |
| 400 | 2037 | 15.3 | 6.54E−01 | 1374.809 |
| 600 | 3056 | 16.3 | 6.13E−01 | 1612.612 |
| 800 | 4074 | 17.0 | 5.88E−01 | 1809.833 |
| 1000 | 5093 | 17.4 | 5.75E−01 | 1936.619 |
| CARBOLITE 20/40 with 3.91 micron thick Ni-coating | | | | |
| 200 | 1019 | 19.5 | 0.513 | 2850.607 |
| 400 | 2037 | 20.9 | 0.478 | 3862.317 |
| 600 | 3056 | 21.5 | 0.465 | 4480.414 |
| 800 | 4074 | 21.9 | 0.457 | 4988.307 |
| 1000 | 5093 | 22.1 | 0.452 | 5279.416 |

Figure 16:
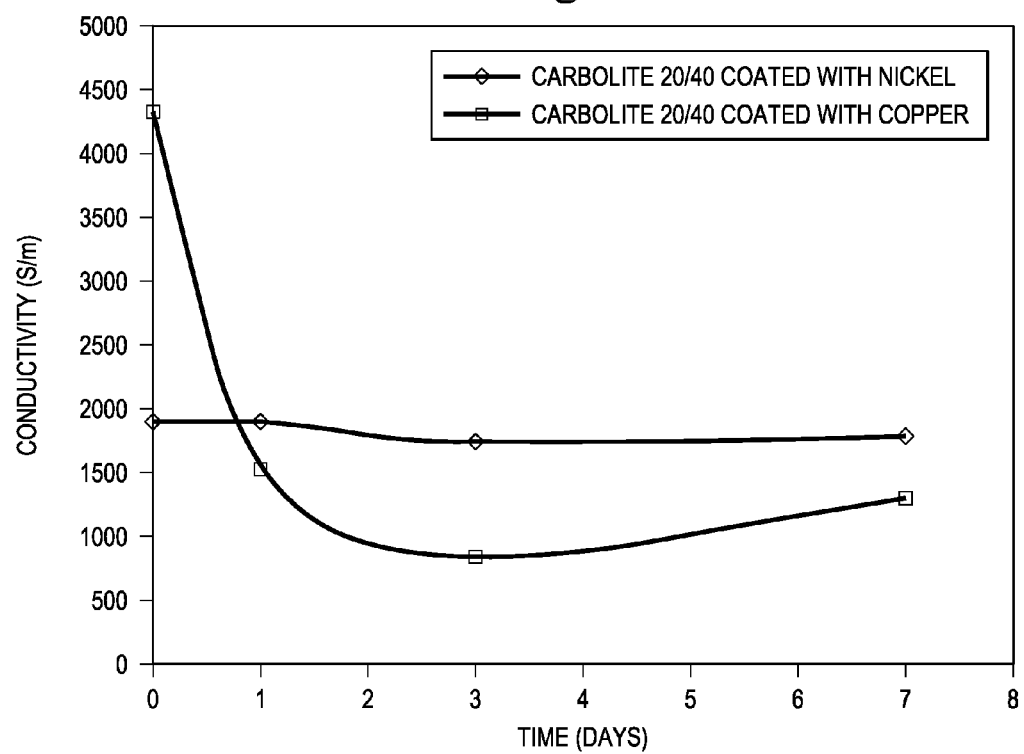
FIG. 16 is a graph of Conductivity (Siemens/m) vs. exposure time to frac fluid at a fixed Closure Pressure (psi) for CARBOLITE 20/40 samples coated with nickel and copper.

Electrical measurements of proppants with coatings of nickel and copper were also conducted as a function of KCl exposure. The results are shown in TABLE IX below and FIG. 16. TABLE IX shows data for CARBOLITE 20/40 with a coating of nickel and CARBOLITE 20/40 with a coating of copper. Each sample was exposed to a 2% KCl solution having a pH of 10 and a temperature of 120° C. for 0 day, 1 day, 3 days, and 7 days. For each sample shown in TABLE IX, the sample material was placed in the 0.5 inch die under a pressure of 3560 psi.

TABLE IX

| Time (days) | Ni-coated CARBOLITE Conductivity (S/m) | Cu-coated CARBOLITE Conductivity (S/m) |
|---|---|---|
| 0 | 1880 | 4314 |
| 1 | 1874 | 1536 |
| 3 | 1718 | 812 |
| 7 | 1763 | 1272 |

Figure 14:
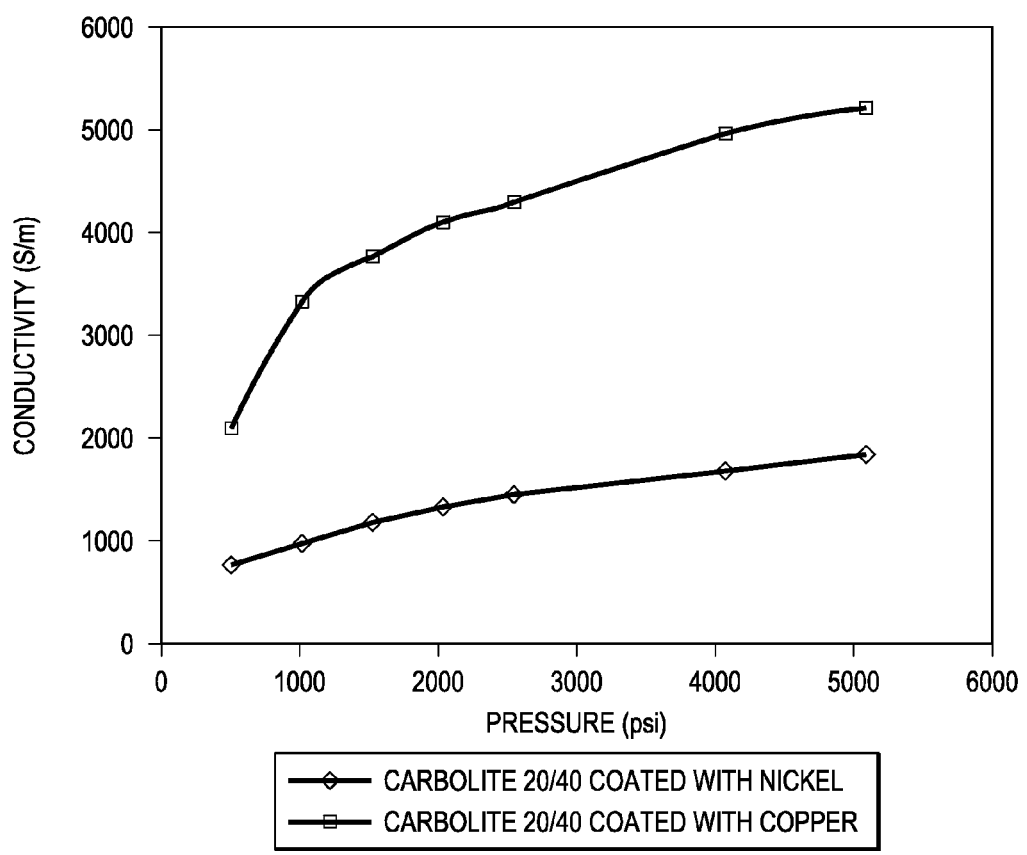
FIG. 14 is a graph of Conductivity (Siemens/m) vs. Pressure (psi) for CARBOLITE 20/40 coated with nickel and CARBOLITE 20/40 coated with copper.

As can be seen from TABLE VII and FIG. 14, the copper coating provides a greater conductivity than the conductivity provided by the nickel. As can be seen from TABLE VIII and FIG. 15, decreasing thicknesses of the nickel coating provide decreasing conductivity. And as can be seen from TABLES VII and VIII as well as FIGS. 14 and 15, the conductivity of the proppant packs, regardless of the relative amounts of coated or un-coated proppant, tends to increase with increasing closure pressure. Lastly, exposure to the KCl solution greatly reduces the conductivity of copper coated proppant, but has little noticeable effect on the conductivity of the nickel coated proppant.

In an exemplary method of fracturing a subterranean formation, a hydraulic fluid is injected into the formation at a rate and pressure sufficient to open a fracture therein, and a fluid containing sintered, substantially round and spherical particles prepared from a slurry as described herein and having one or more of the properties as described herein is injected into the fracture to prop the fracture in an open condition.

The foregoing description and embodiments are intended to illustrate the invention without limiting it thereby. It will be understood that various modifications can be made in the invention without departing from the spirit or scope thereof.

What is claimed is:

1. A proppant pack comprising:
a plurality of particles, each said particle, comprising a coating of an electrically-conductive metal having a thickness of at least about 270 nm formed on the outer surface of each said particle, wherein each particle has a specific gravity of less than 4 and a size of about 100 mesh to about 10 mesh, wherein the pack has an electrical conductivity, and wherein increasing a load on the pack by a factor of 5 increases the electrical conductivity of the pack by at least 50%.

2. The proppant pack of claim 1, wherein the electrically-conductive metal has a thickness of about 500 nm to about 1,200 nm.

3. The proppant pack of claim 1, wherein the pack has an electrical conductivity of at least about 5 S/m.

4. The proppant pack of claim 3, wherein each said particle has a roughness of less than 5 μm.

5. The proppant pack of claim 1, wherein the electrically-conductive metal is selected from the group consisting of aluminum, tin, zinc, copper, silver, nickel, gold, platinum, palladium and rhodium.

6. The proppant pack of claim 1, wherein the proppant pack has a resistivity of less than 0.5 ohm-cm.

7. The proppant pack of claim 1, wherein the outer surface of each said particle comprises palladium, silver, or any combination thereof.

8. The proppant pack of claim 1, wherein the proppant pack has a long term fluid conductivity at 7,500 psi of at least about 100 mD-ft.

9. The proppant pack of claim 1, wherein the plurality of particles is selected from the group consisting of sand, resin coated sand, and sintered, substantially round and spherical particles.

10. The proppant pack of claim 6, wherein increasing the load on the pack by a factor of 2 decreases the resistivity of the pack by about 5% to about 25%.

11. The proppant pack of claim 10, wherein the electrically-conductive metal is deposited onto the outer surface of each said particle using autocatalytic deposition.

12. A method of manufacturing electrically-conductive proppant particles, comprising:

contacting a plurality of particles having a size of about 100 mesh to about 10 mesh with an alkaline solution having a pH greater than 8 to provide conditioned particles; and contacting the conditioned particles with a plating solution comprising one or more electrically-conductive metal to provide electrically-conductive proppant particles comprising a coating of the electrically-conductive metal having a thickness of at least about 270 nm formed on the outer surface of each said particle, wherein a pack of the electrically-conductive proppant particles has an electrical conductivity, and wherein increasing a load on the pack by a factor of 5 increases the electrical conductivity of the pack by at least 50%.

13. The method of claim 12, further comprising:
contacting the conditioned particles with an activation solution comprising a catalytically active material to provide activated particles, wherein the catalytically active material comprises tin, palladium, or silver or any combination thereof; and
contacting the activated particles with the plating solution to provide the electrically-conductive proppant particles.

14. The method of claim 12, further comprising:
contacting the conditioned particles with a reducing agent solution to provide activated particles, wherein the reducing agent solution comprises sodium borohydride, sodium hypophosphite, or sodium cyanoborohydride or any combination thereof; and
contacting the activated particles with the plating solution to provide the electrically-conductive proppant particles.

15. The method of claim 12, wherein the plurality of particles is selected from the group consisting of sand, resin coated sand, and sintered, substantially round and spherical particles.

16. A method of manufacturing electrically-conductive proppant particles, comprising:
activating a plurality of sintered, substantially round and spherical particles to provide activated particles, wherein each of the plurality of sintered, substantially round and spherical particles has a specific gravity of less than 4 and a size of about 100 mesh to about 10 mesh; and
contacting the activated particles with a plating solution comprising one or more electrically-conductive metal to provide electrically-conductive proppant particles comprising a coating of the electrically-conductive metal having a thickness of at least about 270 nm formed on the outer surface of each said particle, wherein a pack of the electrically-conductive proppant particles has an electrical conductivity, and wherein increasing a load on the pack by a factor of 5 increases the electrical conductivity of the pack by at least 50%.

17. The method of claim 16, wherein activating the conditioned particles comprises one of:
contacting the plurality of sintered, substantially round and spherical particles with an activation solution comprising a catalytically active material to provide the activated particles, wherein the catalytically active material comprises tin, palladium, or silver or any combination thereof; or
contacting the plurality of sintered, substantially round and spherical particles with a reducing agent solution to provide the activated particles, wherein the reducing agent solution comprises sodium borohydride, sodium hypophosphite, or sodium cyanoborohydride or any combination thereof.

18. The method of claim 16, wherein the electrically-conductive metal is selected from the group consisting of aluminum, tin, zinc, copper, silver, nickel, gold, platinum, palladium and rhodium.

19. The method of claim 18, wherein the plating solution is an alkaline solution comprising nickel.

20. The method of claim 19, wherein the electrically-conductive proppant particles comprise palladium, phosphorous and nickel deposited on the outer surfaces of the plurality of sintered, substantially round and spherical particles.

* * * * *